United States Patent
MacNaughton et al.

(10) Patent No.: US 11,530,713 B2
(45) Date of Patent: Dec. 20, 2022

(54) SELF-LOCKING MOUNTING SYSTEM

(71) Applicants: TE Connectivity Services GmbH, Schaffhausen (CH); Tyco Electronics UK Ltd., Swindon (GB)

(72) Inventors: Roy MacNaughton, Swindon (GB); Tyler Weber, Columbia, PA (US)

(73) Assignees: TE CONNECTIVITY SOLUTIONS GmbH, Schaffhausen (CH); TYCO ELECTRONICS UK LTD., Swindon (GB)

( * ) Notice: Subject to any disclaimer, the term of this patent is extended or adjusted under 35 U.S.C. 154(b) by 62 days.

(21) Appl. No.: 17/118,939

(22) Filed: Dec. 11, 2020

(65) Prior Publication Data
US 2021/0180625 A1    Jun. 17, 2021

Related U.S. Application Data

(60) Provisional application No. 63/093,982, filed on Oct. 20, 2020, provisional application No. 63/092,198, filed on Oct. 15, 2020, provisional application No. 62/948,914, filed on Dec. 17, 2019.

(51) Int. Cl.
*F16B 2/18* (2006.01)
*F16B 2/10* (2006.01)

(52) U.S. Cl.
CPC . *F16B 2/18* (2013.01); *F16B 2/10* (2013.01)

(58) Field of Classification Search
CPC ............... F16B 2/18; F16B 2/10; H02G 3/32
USPC ............................................ 248/231.31, 68.1
See application file for complete search history.

(56) References Cited

U.S. PATENT DOCUMENTS

| 4,682,748 | A | 7/1987 | Freudenmann et al. |
| 5,739,468 | A | 4/1998 | Rossman et al. |
| 6,206,330 | B1 | 3/2001 | Oi et al. |
| 2003/0136884 | A1* | 7/2003 | Miura ..................... F16B 37/00 248/68.1 |
| 2010/0243294 | A1 | 9/2010 | Ayme et al. |
| 2011/0024184 | A1* | 2/2011 | Clymer ..................... H02G 3/32 174/503 |
| 2014/0374544 | A1* | 12/2014 | Pearson .................. F16L 3/223 248/68.1 |
| 2020/0408334 | A1* | 12/2020 | Proulx .................. F16L 55/035 |

FOREIGN PATENT DOCUMENTS

EP            2218954 A2      8/2010

OTHER PUBLICATIONS

International Search Report, International Application No. PCT/IB2020/061906, International Filing Date, Dec. 14, 2020.

* cited by examiner

*Primary Examiner* — Muhammad Ijaz

(57) ABSTRACT

A mounting system, a clamp and method for mounting to a structural component. The mounting system includes a bracket with a mounting projection, the mounting projection has a mounting opening which extends between side walls of the mounting projection. A clamp has a mounting portion and a clamping portion, the mounting portion has a projection receiving opening which receives the mounting projection therein. A latching mechanism extends from the clamping portion, the latching mechanism has a securing which is movable between an unlocked position and a locked position.

17 Claims, 30 Drawing Sheets

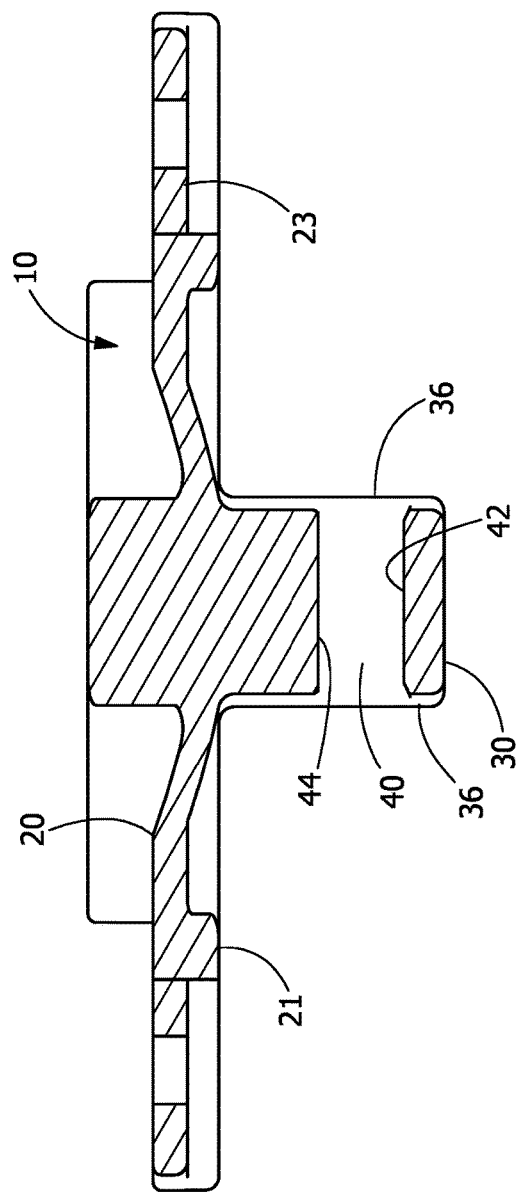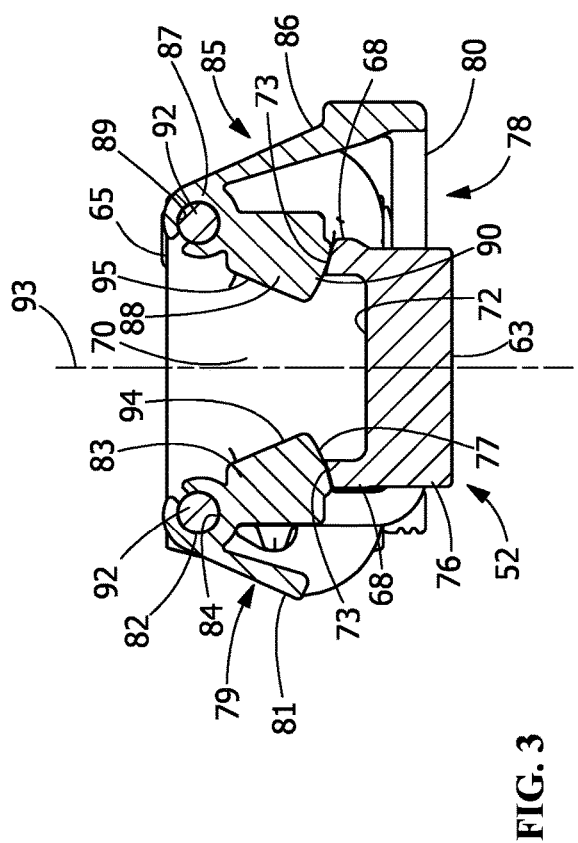
FIG. 3

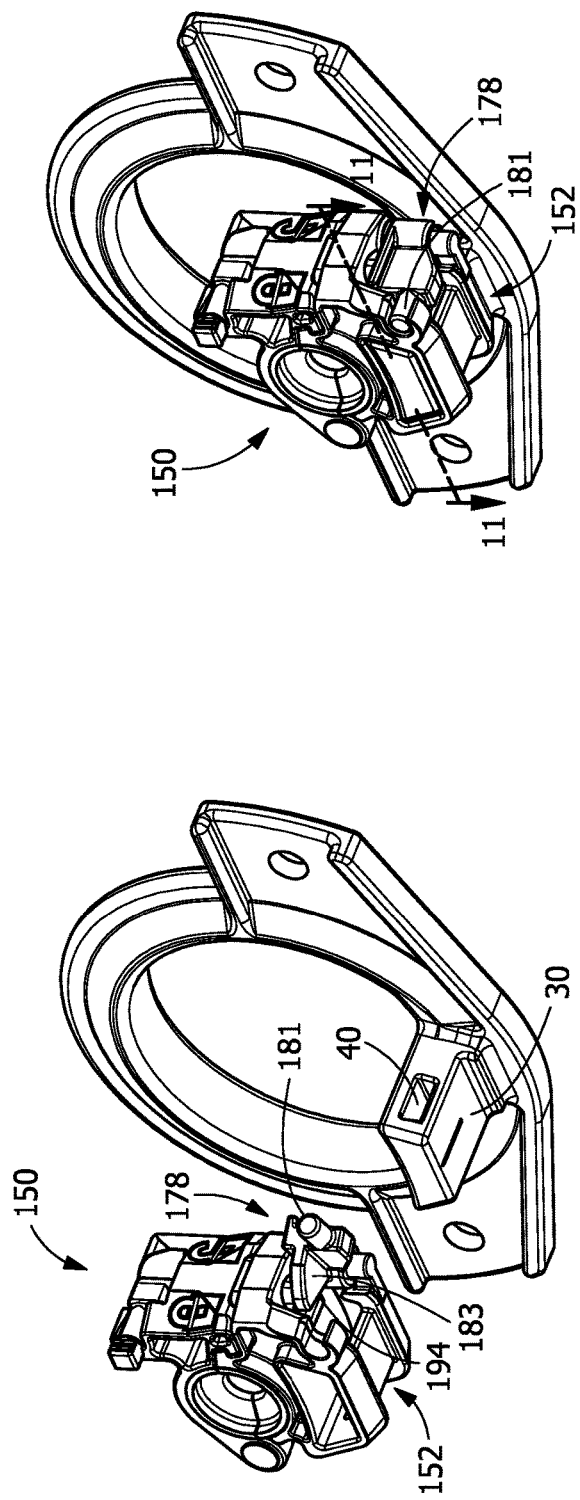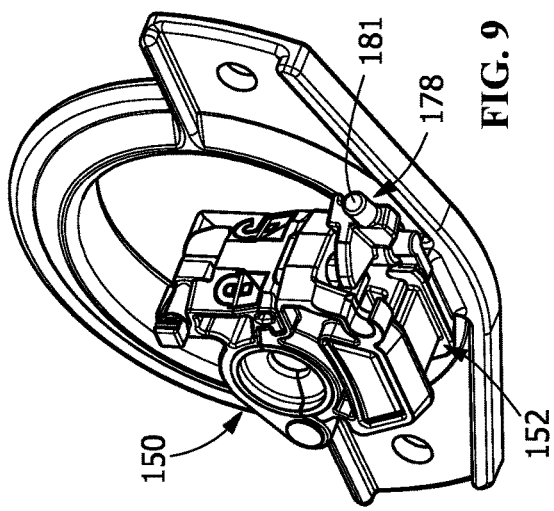

SELF-LOCKING MOUNTING SYSTEM

FIELD OF THE INVENTION

The present invention relates generally to a self-locking clamp, mounting system and method for mounting clamps without the need of tooling or hardware. In particular, the invention relates to a self-locking clamp, mounting system and method for protecting electrical cable, electrical conduit, pneumatic lines, hydraulic lines and other such components, that are mounted on structural members, such as metal beams.

BACKGROUND OF THE INVENTION

Internal structure of vehicles, aircraft and buildings use structural members such as beams formed with openings for components, such as electrical cables, electrical conduit, and the like, that extend through the openings in the structural members. These openings, which are formed in various ways, such as by stamping, cutting, punching and the like, often have sharp edges which can abrade or cut cable insulation or otherwise damage the components extending through the beam openings. Consequently, it is a common practice to protect the components by providing brackets or bushings which fit into the openings to cover their edges.

Various types of bushings are known and used for the purpose described. One known construction is composed of two parts which snap together when the bushing is installed in a beam opening. This type of bushing has several disadvantages and objections, including the need to make and store multiple parts, and the time and inconvenience of handling and assembling the bushing parts on site.

One-piece bushings are known, but present certain problems and disadvantages. For example, some of the conventional one-piece bushings are difficult to insert into the opening. This is particularly true when the bushings are configured to resist being dislodged as the electrical cables or other components are pulled through them.

Another objection common to both and multiple piece and one piece bushings of the prior art is that they are not designed so that a single bushing can accommodate a wide range of different thicknesses of the structural members. Since structural members are made with different thicknesses, it has been necessary to maintain a supply of different size bushings that can be selected and used depending upon the stud structure.

It would, therefore, be beneficial to provide a self-locking clamp, mounting system and method which overcomes the problems with the known art by providing a system which is easy to install, can be used with structural members of varying thickness and which can be properly mounted to the structural member in a fixed orientation. It would also be beneficial to provide a self-locking, tool free, hardware free attachment system which allows for a clamp to be mounted to a bracket of the mounting system.

SUMMARY OF THE INVENTION

An embodiment is directed to A mounting system which includes a bracket and a clamp. The bracket has a mounting projection, the mounting projection has a mounting opening which extends between side walls of the mounting projection. The clamp has a mounting portion and a clamping portion, the mounting portion has a projection receiving opening which receives the mounting projection therein. A latching mechanism extends from the clamping portion, the latching mechanism has a securing which is movable between an unlocked position and a locked position.

An embodiment is directed to a mounting system for mounting to a structural component, the mounting system includes a bracket and a clamp. The bracket has a mounting projection with a mounting opening which extends between side walls of the mounting projection. The clamp has a mounting portion and a clamping portion. The mounting portion has a projection receiving opening which receives the mounting projection of the bracket therein. The mounting portion has a securing opening which extends through side walls of the mounting portion. A latching mechanism is provided on the clamping portion. The latching mechanism has a securing portion which is rotatable between a locked position, in which the securing portion is positioned in the mounting opening, and an unlocked position, in which the securing portion is removed from the mounting opening.

An embodiment is directed to a clamp for use with a bracket. The clamp includes a clamping portion and a mounting portion. The mounting portion has a projection receiving opening which receives a projection extending from the bracket. The mounting portion has a securing opening which extends through side walls of the mounting portion into the projection receiving opening. A latching mechanism is provided on the clamping portion, the latching mechanism having a securing portion which is rotatable between a locked position, in which the securing portion is positioned in a mounting opening of the bracket, and an unlocked position, in which the securing portion is removed from the mounting opening of the bracket.

An embodiment is directed to a method of installing a system to protect components proximate a structural member. The method includes: installing a bracket on the structural component, the bracket having a mounting projection with a mounting opening; securing the bracket to the structural component to prevent rotation of the bracket relative to the structural member; positioning a clamp on the mounting projection of the bracket, the clamp having a clamping portion and a mounting portion, the mounting portion having a projection receiving opening which receives a projection extending from the bracket, the mounting portion having a securing opening which extends through side walls of the mounting portion into the projection receiving opening; and rotating a securing portion of the mounting portion of the clamp to a locked position, in which the securing portion is positioned in the mounting opening, to secure the clamp to the bracket.

Other features and advantages of the present invention will be apparent from the following more detailed description of the illustrative embodiment, taken in conjunction with the accompanying drawings which illustrate, by way of example, the principles of the invention.

BRIEF DESCRIPTION OF THE DRAWINGS

FIG. 3 is a cross-sectional view of the clamp and bracket taken along line 3-3 of FIG. 2.

FIG. 8 is a perspective view of an alternate illustrative clamp of the present invention shown in an initial or preinstalled position relative to the bracket.

FIG. 9 is a perspective view of the illustrative clamp of FIG. 8 shown in a partially installed position relative to the bracket.

FIG. 10 is a perspective view of the illustrative clamp of FIG. 9 shown in a fully installed position relative to the bracket.

DETAILED DESCRIPTION OF THE INVENTION

Figure 1:
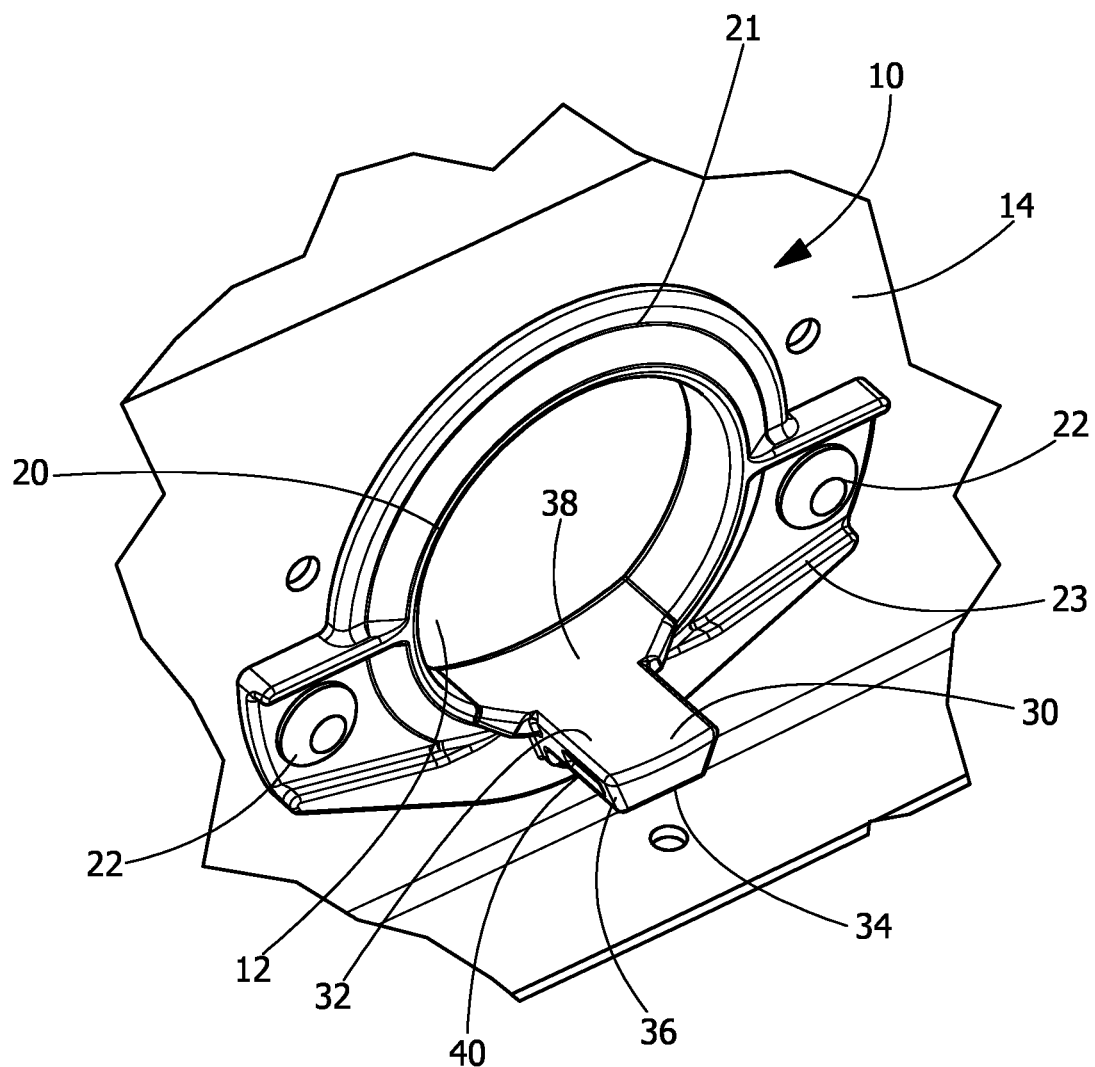
FIG. 1 is a perspective view of an illustrative bracket installed in an opening of a structural member.
Figure 2:
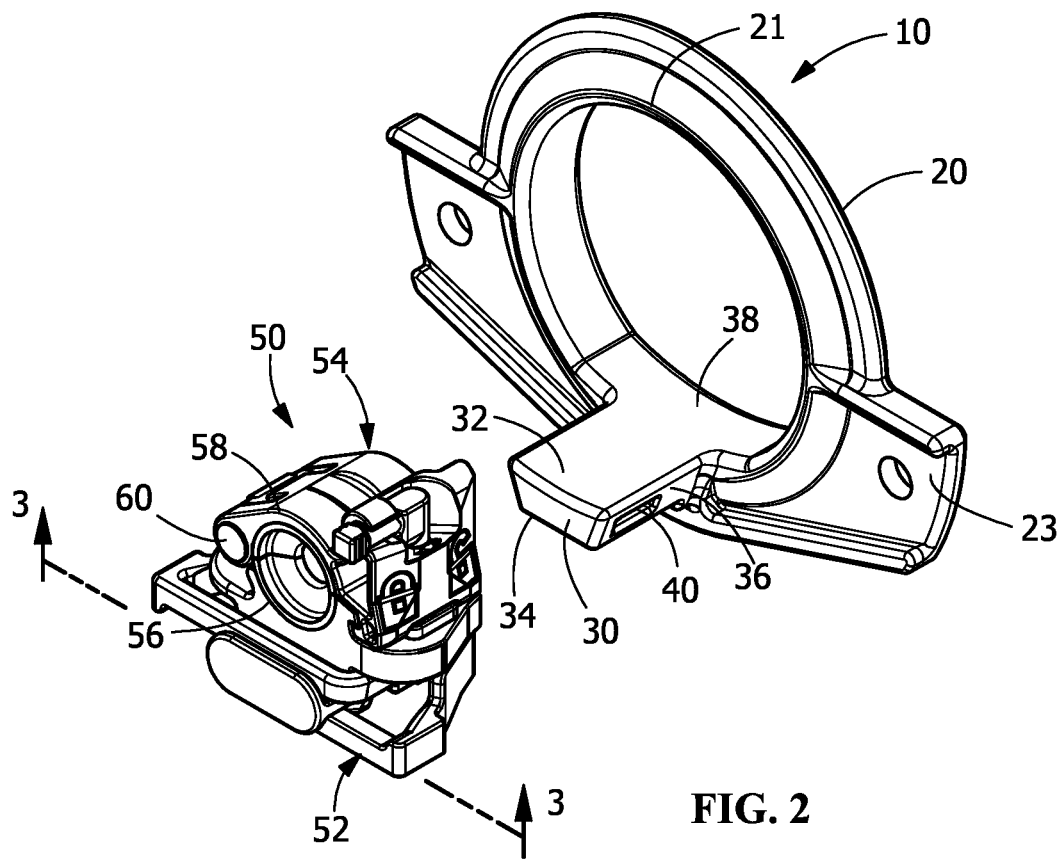
FIG. 2 is a perspective view of an illustrative clamp of the present invention shown in an initial or preinstalled position relative to the bracket.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom"

as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

Moreover, the features and benefits of the invention are illustrated by reference to the preferred embodiments. Accordingly, the invention expressly should not be limited to such embodiments illustrating some possible non-limiting combination of features that may exist alone or in other combinations of features, the scope of the invention being defined by the claims appended hereto.

As shown in FIG. 1, an illustrative bracket 10 is shown in an opening 12 of a structural member 14. The bracket 10 may be of, for example, polymer material, thermoplastic material, composite material or metal. The opening 12 may be a lightening hole or other type of opening. The structural member 14 may be, but is not limited to, a frame or bulkhead of a vehicle, a beam or a bulkhead of an aircraft, or a beam of a building. The opening 12 may be formed in various ways, such as by stamping, cutting, punching and the like. The opening 12 has a side wall or edge which can abrade or cut or otherwise damage components extending through the opening 12. The components may be, but are not limited to, cables, cable bundles or pipes. The bracket 10 shown is meant to be illustrative, as other embodiments of the bracket 10 may be used. For example, the bracket 10 may be, but is not limited to, an L-shaped bracket, an edge mounted bracket, a revolving adhesively mounted bracket, a revolving rive mounted bracket.

The bracket 10 includes a circular section or grommet portion 20 which is fastened to the structural member 14 by means of fastening members 22, such as, but not limited to, rivets. The bracket 10 is fastened to the structural member 14 to prevent the rotation of the bracket 10 relative to the structural member 14. A flange 21 and structural plate 23 extend from the grommet portion 20. The flange 21 cooperates with the structural member 14 to properly position the grommet portion 20 relative to the structural member 14. The structural plate 23 cooperates with the fastening members 22 to retain the grommet portion 20 to the structural member 14. An axis of opening 12 is perpendicular to the plane of the structural plate.

As shown in FIG. 1, the grommet portion 20 has a circular lateral cross section. However, the grommet portion 20 may have other configurations, such as, but not limited to, an oblong lateral cross section without departing from the scope of the invention. The grommet portion 20 is shaped and sized to suitably fit the opening 12. The circular grommet portion 20 is formed to fit inside the opening 12 in the structural member 14, and the grommet portion 20 is of sufficient length to ensure that the components do not come into contact with the side wall of the structural member 14. The bracket 10 is configured to support components and protect them from the side wall or edges of the structural member 14 to which the bracket 10 is mechanically fixed.

Figure 5:
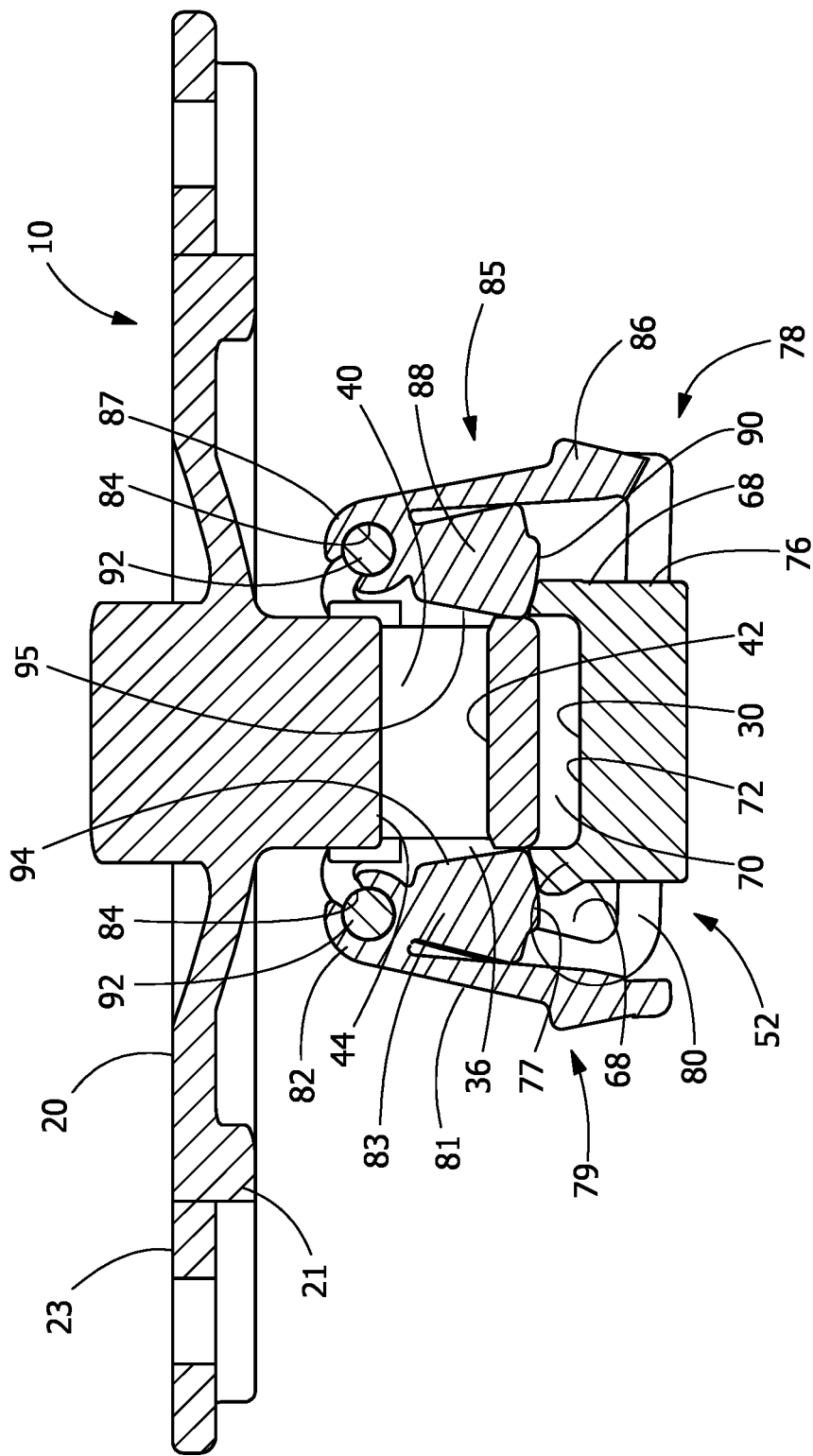
FIG. 5 is a cross-sectional view of the clamp and bracket taken along line 5-5 of FIG. 4.
Figure 7:
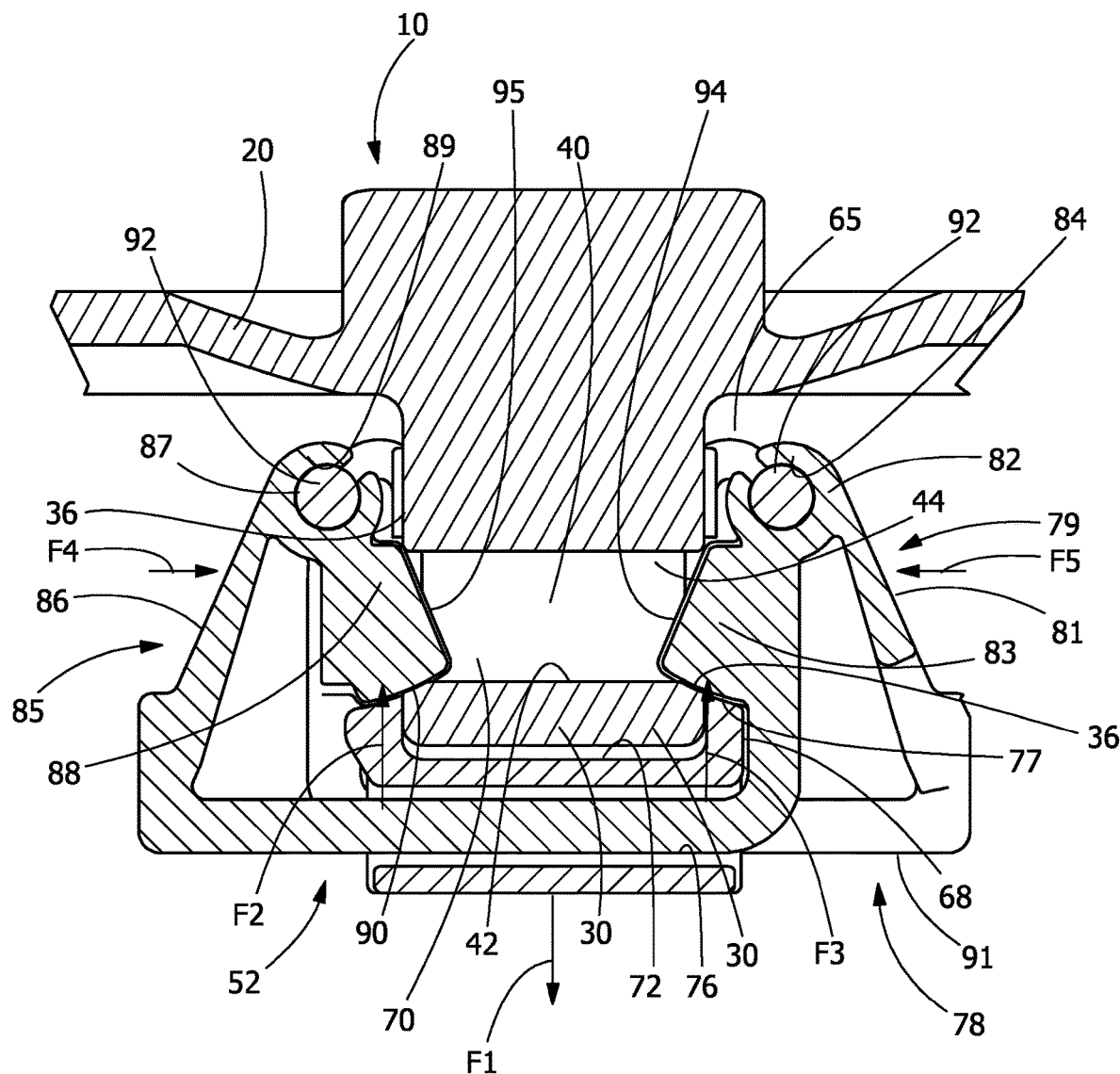
FIG. 7 is a cross-sectional view of the clamp and bracket taken along line 7-7 of FIG. 6 illustrating the forces applied to the clamp to allow the clamp to be removed from the bracket.

As shown in FIG. 1, a mounting projection or protrusion 30 extends from the grommet portion 20. The projection 30 has a top or cable support wall 32, and oppositely facing bottom wall 34 and side walls 36 which extend between the cable support wall 32 and the bottom wall 34. The cable support wall 32 is positioned in line with an inner surface 38 of the grommet portion 20. A securing or mounting opening 40 extends through the projection 30 in a direction which is essentially parallel to the cable support wall 32. The opening 40 extends through the side walls 36. As shown in FIGS. 3, 5 and 7, the opening 40 has a first or front wall 42 and a second or back wall 44.

Referring to FIGS. 2 through 7, a cable clamp 50 may be used to secure the component to the bracket 10 and to the structural member 14. In the illustrative embodiment shown, the clamp 50 has a mounting portion 52 and a clamping portion 54. The clamping portion 54 has a fixed clamping arm 56 and a movable clamping arm 58 which pivots about pivot member 60 between and open position and a closed or clamped position. The movable clamping arm 58 cooperates with the component when the component is positioned between the fixed clamping arm 56 and the movable clamping arm 58 and the movable clamping arm 58 is moved to the closed position. The fixed clamping arm 56 extends from and is attached to the mounting portion 52. In the illustrative embodiment, the clamping portion 54 is a P-clamp, but other types of clamps can be used. P-clamps are described in US Patent Applications Publications 2018/0273500 and 2017/0146154, which are hereby incorporated by reference in their entirety.

The clamping portion 54 may be configured to cooperate with different sized components. For example, when in the closed or clamped position the clamping portion may have a diametrical range of: 3.175-6.35 mm; 6.35-9.525 mm, 9.525-12.7 mm; 12.7-15.875 mm; 15.875-19.05 mm; 19.05-22.2 mm; or 22.2-25.4 mm.

As shown in FIGS. 3, 5 and 7, the mounting portion 52 has a front wall 63, a back wall 65, and side walls 68. A projection receiving opening 70 extends through the mounting portion 52 from one side wall 68 to an opposite side wall 68.

The opening 70 has a front or first wall 72. The opening is dimensioned to receive the projection 30 therein. The opening 70 is configured to have a similar, but slightly larger configuration than the projection 30 to allow the projection 30 to be inserted into the opening 70, while preventing the unwanted movement of the clamp 50 relative to the bracket 10.

A latch receiving cavity 76 is provided in the front wall 63 of the mounting portion 52. The latch receiving cavity 76 extends from one side wall 68 to the opposite side wall 68. Securing member receiving openings or cavities 73 extend through side walls 68 into the opening 70.

As shown in FIGS. 3, 5 and 7, a latching mechanism 78 is positioned in the latch receiving cavity 76. The latching mechanism 78 has a first latching arm 79 which extends from a cross member 80 which is retained in the latch receiving cavity 76. The first latching arm 79 has a first engagement portion 81, a first pivoting portion 82 and a first securing member or portion 83. The first pivoting portion 82 has a first opening 84 provided therein. The first securing portion 83 has a first securing surface 77 provided at a free end of the first securing portion 83 which is spaced from the first pivoting portion 82. The first securing portion 83 has a first camming surface 94 which extends between the first securing surface 77 and the first pivoting portion 82.

The latching mechanism 78 has a second latching arm 85 which extends from the cross member 80 which is retained in the latch receiving cavity 76. The second latching arm 85 has a second engagement portion 86, a second pivoting portion 87 and a second securing portion 88. The second pivoting portion 87 has a second opening 89 provided therein. The second securing portion 88 has a second securing surface 90 provided at a free end of the second securing portion 88 which is spaced from the second pivoting portion 87. The second securing portion 88 has a second camming surface 95 which extends between the second securing surface 90 and the second pivoting portion 87. The second latching arm 85 has an overstress protection member 91 (FIG. 7) which extends from the second engagement portion 86.

The first opening 84 and the second opening 89 are inserted over posts 92 of the mounting portion 52 to retain the latching mechanism 78 in position on the mounting portion 52. In addition, the cross member 80 which is positioned in the latch receiving cavity 76 to further retain the latching mechanism 78 in position on the mounting portion 52. The positioning of the posts 92 in the openings 84, 89 allows the securing portion 83, 88 to pivot or rotate about the posts 92. The positioning of the cross member 80 in the latch receiving cavity 76 prevent the latching mechanism from moving in a direction in line with a longitudinal axis 93 (FIG. 3) of the mounting portion 52. However, the cross member 80 is free to move in the latch receiving cavity 76 in a direction which is transverse to the longitudinal axis 93 of the mounting portion 52.

The first securing portion 83 is configured to rotate about a respective post 92 between a first or unlocked position (as shown in FIG. 3) and a second or locked position (as shown in FIG. 7). The second securing portion 88 is configured to rotate about another respective post 92 between a first or unlocked position (as shown in FIG. 3) and a second or locked position (as shown in FIG. 7).

The installation of the clamp 50 onto the mounting projection 30 of the bracket 10 is shown in FIGS. 3 through 7. Prior to the clamp 50 engaging the mounting projection 30, the latching mechanism 78 is in the position shown in FIGS. 2 and 3. In this position, the first camming surface 94 and a portion of the first securing surface 77 of the first securing portion 83 extend through a securing member receiving cavity 73 and into the projection receiving opening 70. The configuration of the latching mechanism 78 and the cooperation of the first pivoting portion 82 with the post 92 resiliently maintains the first camming surface 94 and the portion of the first securing surface 77 of the first securing portion 83 in the initial position.

Similarly, the second camming surface 95 and a portion of the second securing surface 90 of the second securing portion 88 extend through the securing member receiving cavity 73 and into the projection receiving opening 70. The configuration of the latching mechanism 78 and the cooperation of the second pivoting portion 87 with the post 92 resiliently maintains the second camming surface 95 and the portion of the second securing surface 90 of the second securing portion 88 in the initial position.

Figure 4:
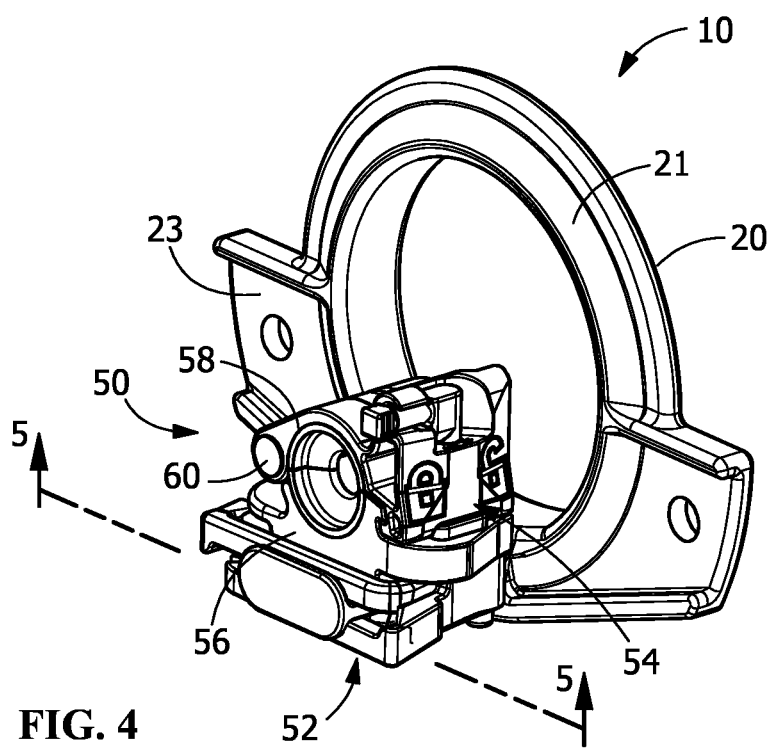
FIG. 4 is a perspective view of the illustrative clamp of FIG. 2 shown in a partially installed position relative to the bracket.

As the clamp 50 is moved onto the mounting projection 30 of the bracket 10, as shown in FIGS. 4 and 5, the mounting projection 30 is moved into the projection receiving opening 70. As this occurs, the side walls 36 of the mounting projection 30 engage the first camming surface 94 and the second camming surface 95, causing the camming surfaces 94, 95 and the securing portions 83, 88 to resiliently pivot about the pivoting portions 82, 87 and the posts 92. This allows for the continued insertion of the clamp 50 onto the mounting projection 30 of the bracket 10.

Figure 6:
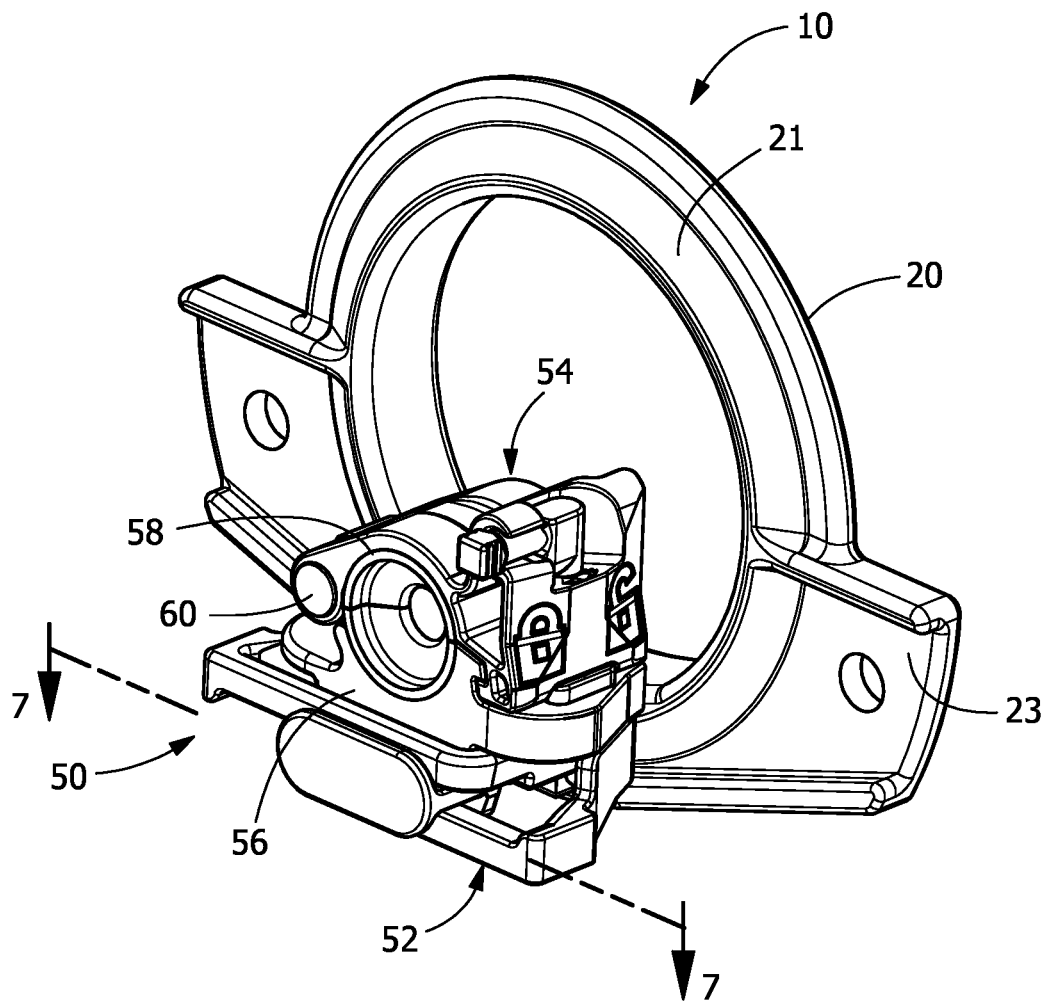
FIG. 6 is a perspective view of the illustrative clamp of FIG. 2 shown in a fully installed position relative to the bracket.

Insertion continues until the mounting projection 30 engages or is proximate to the wall 72 of the projection receiving opening 70, as shown in FIGS. 6 and 7. In this position, the camming surfaces 94, 95 are positioned in line with the securing or mounting opening 40 of the mounting projection 30. This allows the camming surfaces 94, 95 and the securing portions 83, 88 to pivot about the pivoting portions 82, 87 and the posts 92 to resiliently return toward their unstressed or initial position. As shown in FIG. 7, with the securing portions 83, 88 positioned in the mounting opening 40, the securing surfaces 77, 90 engage or are proximate to the first or front wall 42 of the opening 40. In this position, the clamp 50 is secured to the mounting projection 30 of the bracket 10.

As shown in FIG. 7, the latching mechanism 78 resists the unwanted removal of the clamp 50 from the mounting projection 30 of the bracket 10. If a force F1 is applied to the clamp 50, resulting forces F2 and F3 will be applied to the securing surfaces 77, 90 of the securing portions 83, 88 of the latching mechanism 78. As the securing surfaces 77, 90 have an arcuate configuration, the application of forces causes the securing surfaces 77, 90 and the securing portions 83, 88 to pivot further into the mounting opening 40, thereby preventing the unwanted removal of the clamp 50 from the bracket 10.

In order to remove the clamp 50 from the mounting projection 30 of the bracket 10, an operator or user applies forces F4 and F5 to the first engagement portion 81 of the of the first latching arm 79 and to the second engagement portion 86 of the second latching arm 85. The application of the forces F4 and F5 causes the latching arms 79, 85 to move inward, toward each other. This in turn causes the securing surfaces 77, 90 and the securing portions 83, 88 to pivot outward about the pivoting portions 82, 87 and the posts 92, causing the securing surfaces 77, 90 to be moved out of the opening 40. With the securing surfaces 77, 90 removed from the opening 40, the clamp 50 may be removed from the mounting projection 30 of the bracket 10.

The first latching arm 79 and the second latching arm 85 comprise two pivoting self-locking latches which ensure that the cable clamp 50 cannot vibrate loose from the bracket 10 when the latching arms 79, 85 are in a locked condition. Having two self-locking latching arms 79, 85 adds an element of redundancy as either of the two pivoting self-locking latching arms 79, 85 can securely retain the clamp 50 to the bracket 10 alone. Additionally, when the latching arms 79, 85 are in a locked position they self-tighten, or self-lock due to the geometry of its design.

The latching arms 79, 85 and the latching mechanism 78 allow the user to install the clamp 50 by simply pushing it onto the mounting projection 30 of the bracket 10. The latching arms 79, 85 of the latching mechanism 78 automatically lock into place, thus simplifying the installation procedure and removing the risk of forgetting to latch the clamp in place.

The latching mechanism 78 and latching arms 79, 85 are ergonomically & spatially designed. The user simply has to squeeze the first engagement portion 81 and the second engagement portion 86 of the latching mechanism 78 and pulls the clamp 50 free from the bracket 10. The squeezing of the first engagement portion 81 and the second engagement portion 86 causes the two pivoting latching arms 79, 85 to be moved out of the locked position and allows the clamp 50 to be removed.

Figure 11:
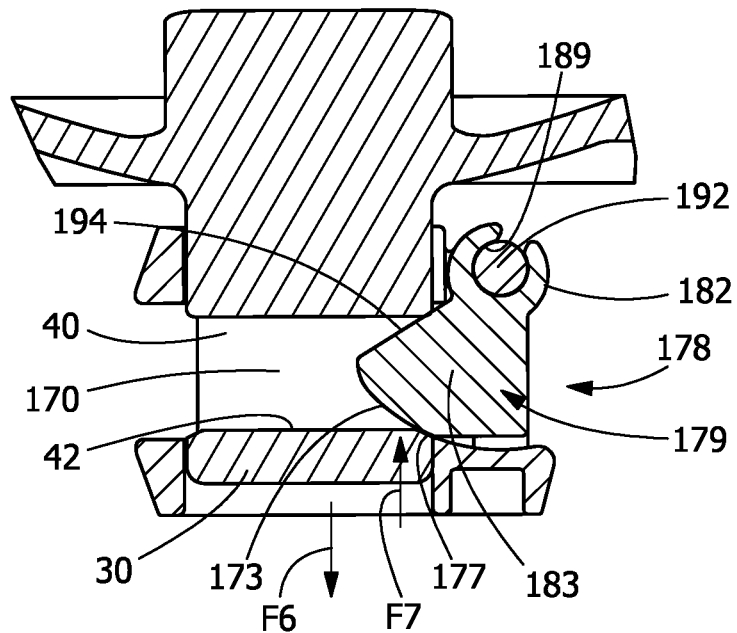
FIG. 11 is a cross-sectional view of the clamp and bracket taken along line 11-11 of FIG. 10.
Figure 12:
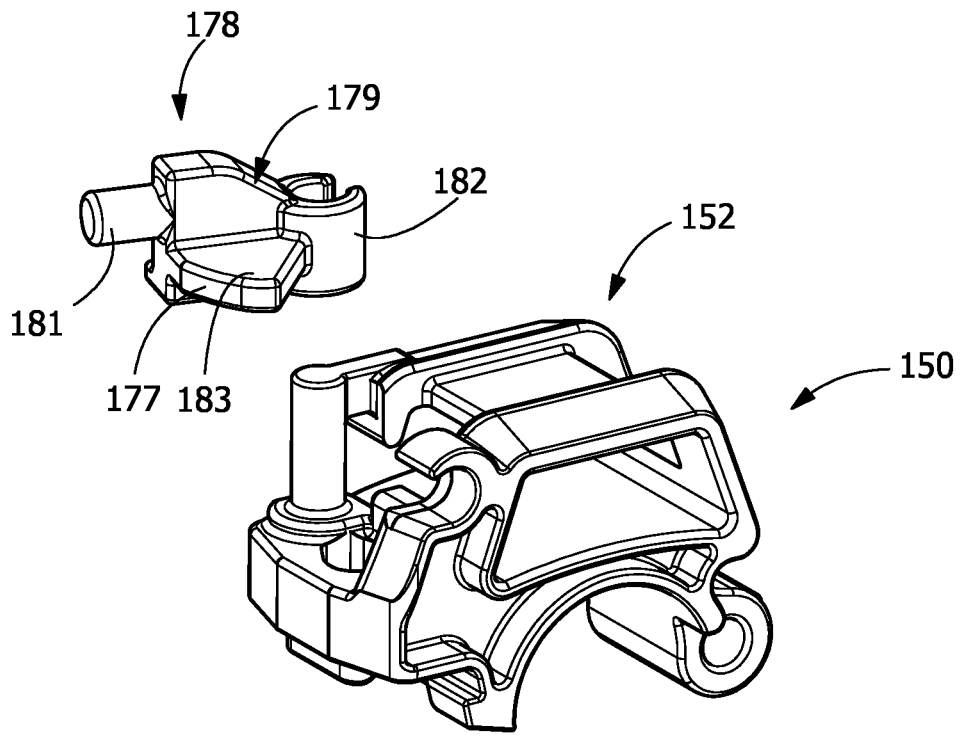
FIG. 12 is a perspective bottom view of the clamp with the latch exploded therefrom.

An alternative embodiment of a clamp 150 is shown in FIGS. 8 through 12. As shown in FIGS. 11 and 12, the latching mechanism 178 has a latching arm 179 with an engagement portion 181, a pivoting portion 182 and a securing member or portion 183. The pivoting portion 182 has an opening 184 provided therein. The securing portion 183 has a securing surface 177 provided at a free end of the securing portion 183 which is spaced from the pivoting portion 182.

The first opening 184 is inserted over post 192 of the mounting portion 152 to retain the latching mechanism 178 in position on the mounting portion 152. The positioning of the post 192 in the opening 184 allows the securing portion 183 to pivot or rotate about the post 192. The securing portion 183 is configured to rotate about the post 192 between a first or unlocked position (as shown in FIG. 9) and a second or locked position (as shown in FIG. 10).

The installation of the clamp 150 onto the mounting projection 30 of the bracket 10 is shown in FIGS. 8 through 10. Prior to the clamp 150 engaging the mounting projection 30, the latching mechanism 178 is in the position shown in FIG. 8. In this position, the first securing surface 177 of the securing portion 183 does not extend through a securing member receiving cavity 173 and does not extend into the projection receiving opening 170. The camming surface 194 and the portion of the securing surface 177 of the securing portion 183 are in the initial position.

Insertion of the clamp 150 onto the bracket 10 continues until the clamp 50 engages or is proximate to the bracket, as shown in FIGS. 9 and 10. In this position, the latching mechanism 178 is rotated from the position shown in FIG. 9 to the position shown in FIG. 10. As this occurs, the camming surfaces 194, which are positioned in line with the securing or mounting opening 40 of the mounting projection 30, pivot about the pivoting portions 182 and the post 192 to move to the locked position, in which the securing portion 183 is positioned in the mounting opening 40. In this position, the securing surface 177 engages or are proximate to the first or front wall 42 of the opening 40, thereby securing the clamp 150 the mounting projection 30 of the bracket 10.

As shown in FIG. 11, the latching mechanism 178 resists the unwanted removal of the clamp 150 from the mounting projection 30 of the bracket 10. If a force F6 is applied to the clamp 150, resulting forces F7 will be applied to the securing surface 177 of the securing portion 183 of the latching mechanism 178. As the securing surface 177 has an arcuate configuration, the application of forces causes the securing surface 177 and the securing portion 183 to pivot or rotate further into the mounting opening 40, thereby preventing the unwanted removal of the clamp 150 from the bracket 10.

In order to remove the clamp 150 from the mounting projection 30 of the bracket 10, an operator or user rotates the latching mechanism 178 from the position shown in FIG. 10 to the position shown in FIG. 9. This causes the securing surface 177 to be moved out of the opening 40. With the securing surface 177 removed from the opening 40, the clamp 150 may be removed from the mounting projection 30 of the bracket 10.

The clamps 50, 150 provide a reliable means of securely fastening the component, such as cable bundle, in a tool-less and fast to install manner, reducing the number of parts needed to be stocked. Additionally, the first latching mechanisms 78, 178 ensure that the clamps 50, 150 are secure to the component and the bracket 10 and cannot vibrate loose.

Figure 13:
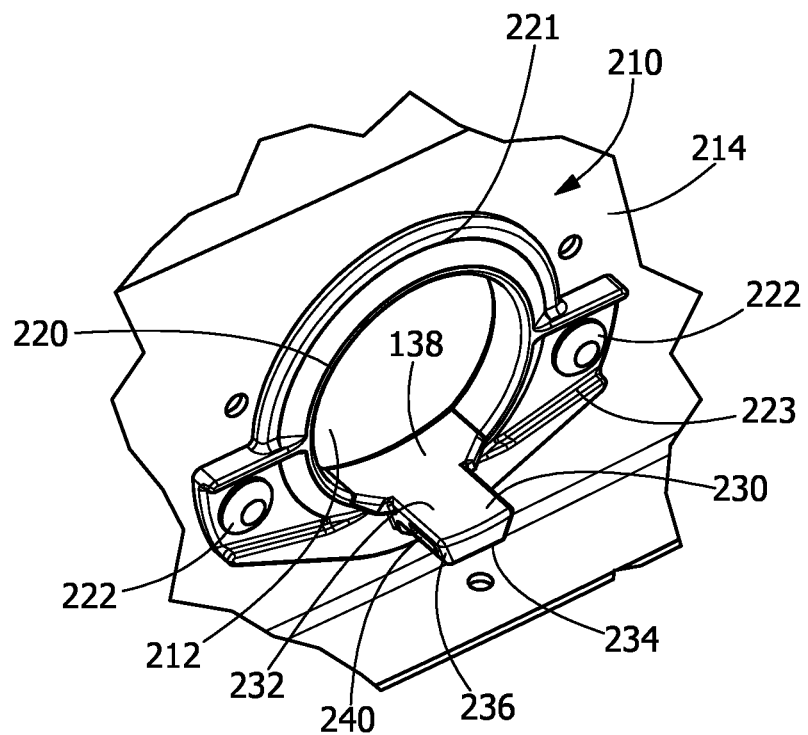
FIG. 13 is a perspective view of an illustrative bracket installed in an opening of a structural member.

Referring to FIG. 13, an alternate bracket 210 is shown in an opening 212 of a structural member 214. The bracket 210 may be of, for example, polymer material, thermoplastic material, composite material or metal. The opening 212 may be a lightening hole or other type of opening. The structural member 214 may be, but is not limited to, a frame or bulkhead of a vehicle, a beam or a bulkhead of an aircraft, or a beam of a building. The opening 212 may be formed in various ways, such as by stamping, cutting, punching and the like. The opening 212 has a side wall or edge which can abrade or cut or otherwise damage components 18 extending through the opening 212. The components 18 may be, but are not limited to cables, cable bundles or pipes.

The bracket 210 includes a circular section or grommet portion 220 which is fastened to the structural member 214 by means of fastening members 222, such as, but not limited to, rivets. The bracket 210 is fastened to the structural member 214 to prevent the rotation of the bracket 210 relative to the structural member 214. A flange 221 and structural plate 223 extend from the grommet portion 220. The flange 221 cooperates with the structural member 214 to properly position the grommet portion 220 relative to the structural member 214. The structural plate 223 cooperates with the fastening members 222 to retain the grommet portion 220 to the structural member 214. An axis of opening 212 is perpendicular to the plane of the structural plate.

As shown in FIG. 13, the grommet portion 220 has a circular lateral cross section. However, the grommet portion 220 may have other configurations, such as, but not limited to, an oblong lateral cross section without departing from the scope of the invention. The grommet portion 220 is shaped and sized to suitably fit the opening 212. The circular grommet portion 220 is formed to fit inside the opening 212 in the structural member 214, and the grommet portion 220 is of sufficient length to ensure that the components 218 do not come into contact with the side wall of the structural member 214. The bracket 210 is configured to support components 218 and protect them from the side wall or edges of the structural member 214 to which the bracket 210 is mechanically fixed.

As shown in FIG. 13, a projection or protrusion 230 extends from the grommet portion 220. The projection 230 has a top or cable support wall 232, and oppositely facing bottom wall 234 and side walls 236 which extend between the cable support wall 232 and the bottom wall 234. The cable support wall 232 is positioned in line with an inner surface 238 of the grommet portion 220. A mounting opening 240 extends through the projection 230 in a direction which is essentially parallel to the cable support wall 232. The opening 240 extends through the side walls 236.

Figure 19:
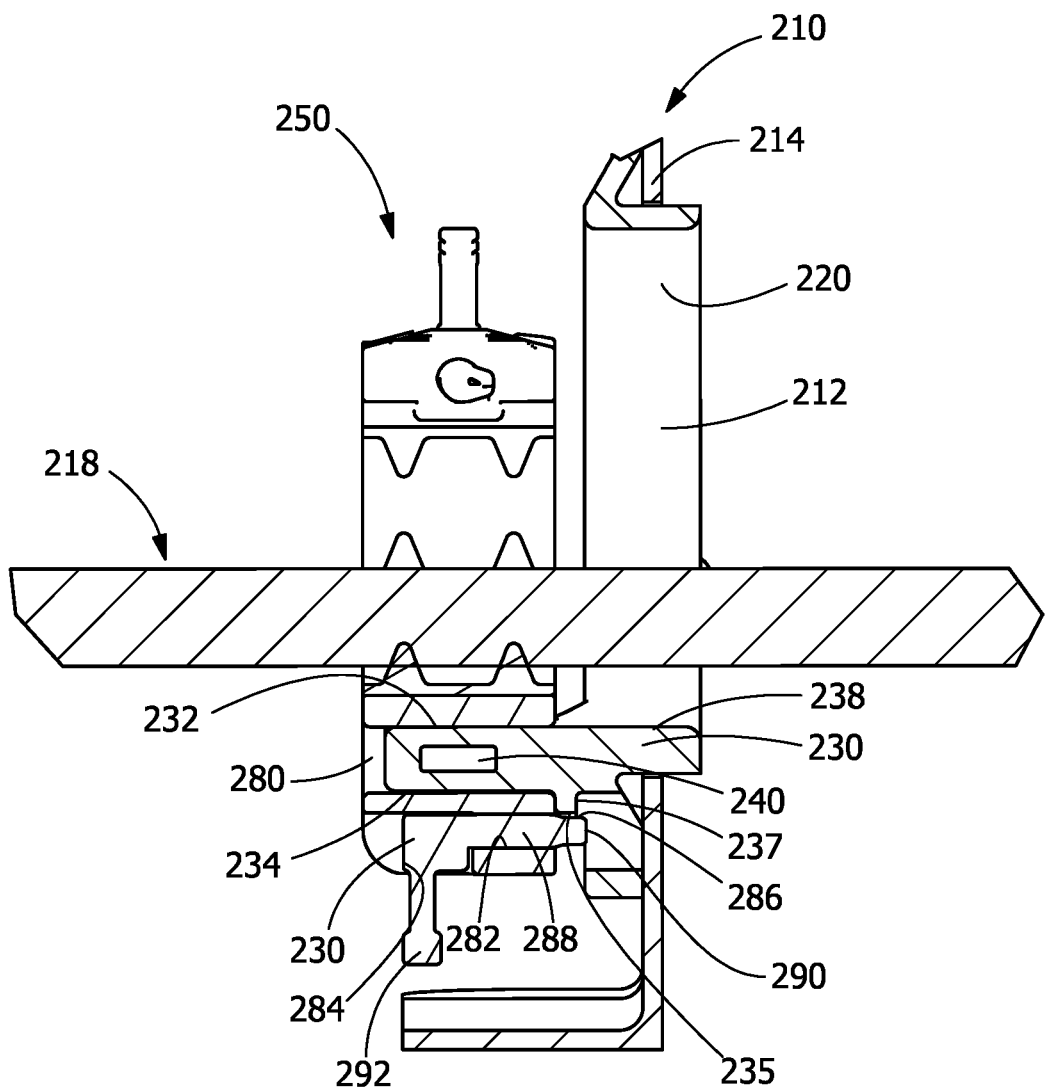
FIG. 19 is a cross-sectional view of the clamp shown in FIG. 18, taken along line 19-19.
Figure 21:
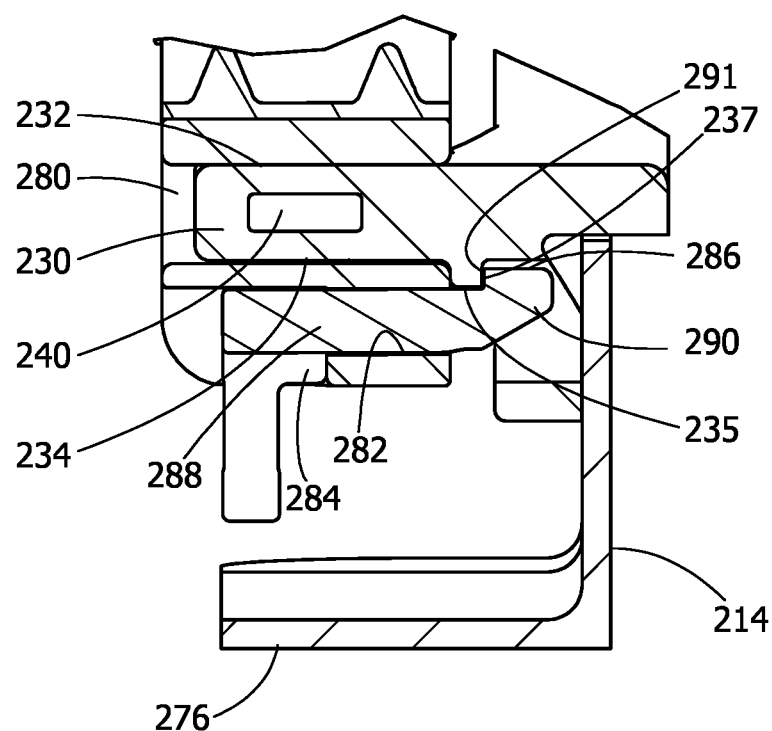
FIG. 21 is a cross-sectional view of the clamp shown in FIG. 20, taken along line 21-21.

As shown in FIGS. 19 and 21, securing projection 235 extends from the bottom wall 234 in a direction away from the cable support wall 232. The securing projection 235 has a securing shoulder or wall 237 which faces and is essentially parallel to a surface of the structural member 214, although other configurations and orientations of the securing projection 235 and the securing shoulder 237 may be used.

Figure 14:
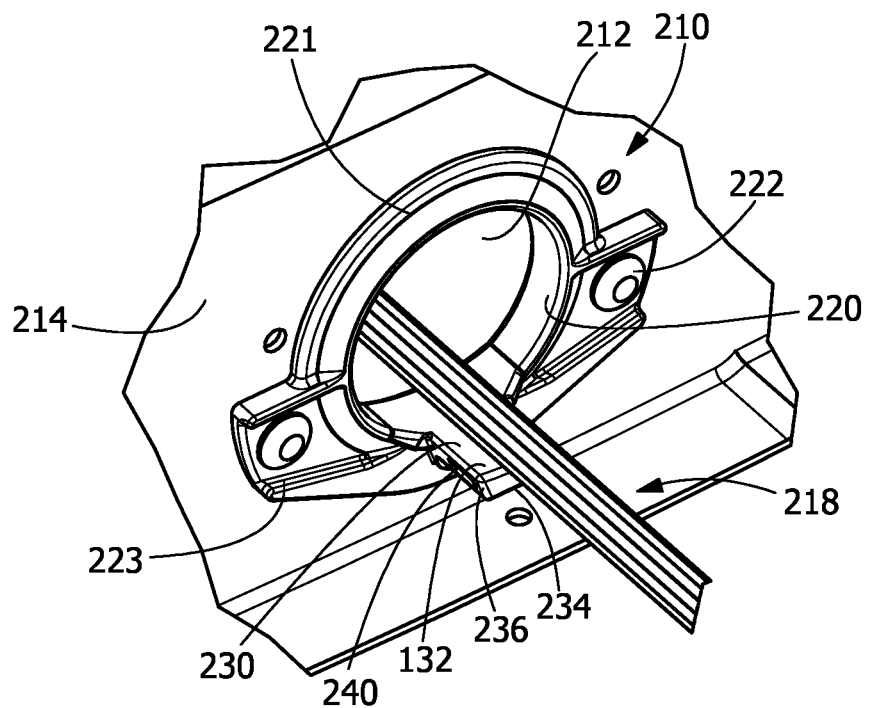
FIG. 14 is a perspective view of an illustrative cable inserted through the opening of the structural member and through the bracket.
Figure 15:
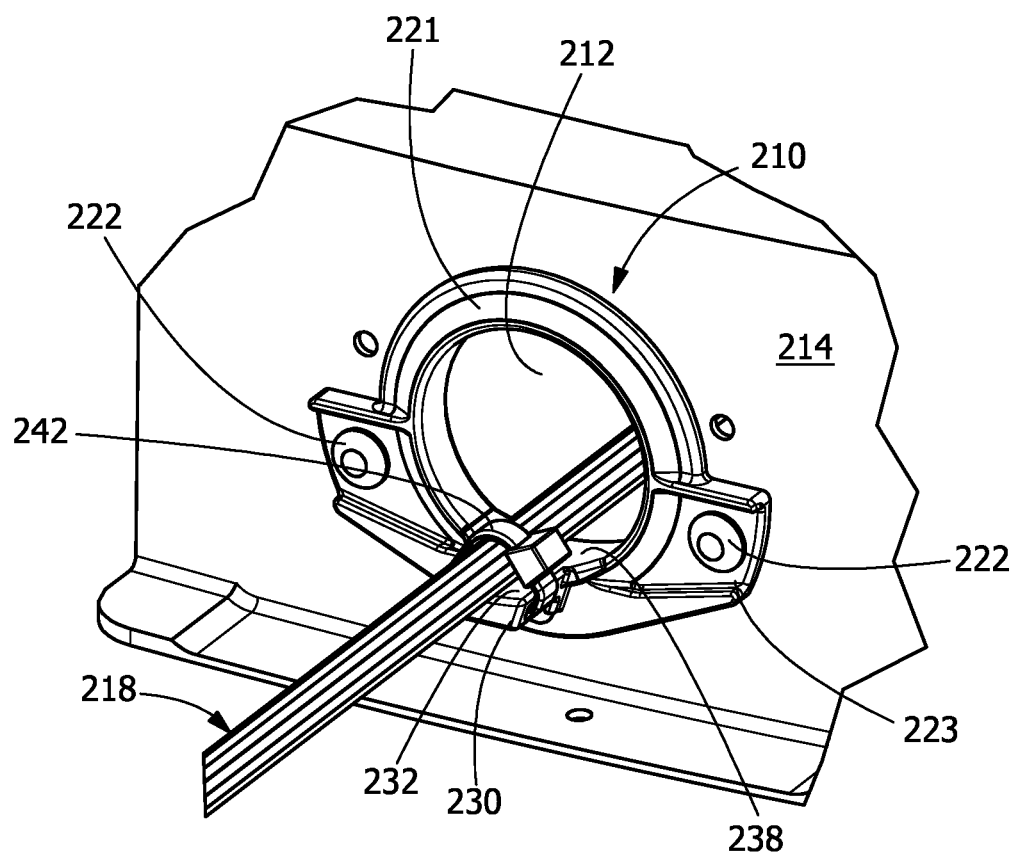
FIG. 15 is a perspective view of the cable inserted through the opening of the structural member and through the bracket with a cable tie extending around the cable.

As shown in FIGS. 14 and 15, the cable bundle or component 218 is inserted through the grommet portion 220 of the bracket 210 which is positioned in the opening 212 of the structural member 214. The component 218 is positioned in contact with the inner surface 238 of the grommet portion 220 and the cable support wall 232 of the projection 230. As shown in FIG. 15, a portion of a tie or strap 242 is positioned in the mounting opening 240 to properly position and secure the mounting opening 240 relative to the projection 230. The tie or strap 242 is then wrapped around the component 218 and tightened to secure the component 218 to the projection 230 and to the bracket 210. The tie or strap 242 operates in a known manner, such as, but not limited to a push mount type tie that includes a self-locking pin. In other embodiments, the tie or strap 242 is positioned in the mounting opening 240 prior to the component 218 being positioned in contact with the inner surface 238 of the grommet portion 220 and the cable support wall 32 of the projection 230.

Referring to FIGS. 16 through 23, an alternate cable clamp 250 may be used to secure the component to the bracket 210 and to the structural member 214. In the illustrative embodiment shown, the clamp 250 has a mounting portion 252 and a clamping portion 254. The clamping portion 254 has a fixed clamping arm 256 and a movable clamping arm 258 which pivots about pivot member 260 between and open position and a closed or clamped position. The movable clamping arm 258 cooperates with the component when the component is positioned between the fixed clamping arm 256 and the movable clamping arm 258 and the movable clamping arm 258 is moved to the closed position. The fixed clamping arm 256 extends from and is attached to the mounting portion 252. In the illustrative embodiment, the clamping portion 254 is a P-clamp, but other types of clamps can be used. P-clamps are described in US Patent Applications Publications 2018/0273500 and 2017/0146154, which are hereby incorporated by reference in their entirety.

The clamping portion 254 may be configured to cooperate with different sized components. For example, when in the closed or clamped position the clamping portion may have a diametrical range of: 3.175-6.35 mm; 6.35-9.525 mm, 9.525-12.7 mm; 12.7-15.875 mm; 15.875-19.05 mm; 19.05-22.2 mm; or 22.2-25.4 mm.

The mounting portion 252 has a top wall 274, a bottom wall 276 and side walls 278 which extend between the top wall 274 and the bottom wall 276. A projection receiving opening 280 extends through the mounting portion 252 from one side wall 278 to an opposite side wall 278. The opening 280 is dimensioned to receive the projection 230 therein. The opening 280 is configured to have a similar, but slightly larger configuration than the projection 230 to allow the projection 230 to be inserted into the opening 280, while preventing the unwanted movement of the clamp 250 relative to the bracket 210.

As shown in FIGS. 19 and 21, a latch receiving cavity 282 is provided in the bottom wall 276 of the mounting portion 252. The latch receiving cavity 282 extends from one side wall 278 toward or to the opposite side wall 278. An enlarged recess 284 intersects the latch receiving cavity 282 proximate the one side wall 278. The latch receiving cavity 282 has an opening 286 which extend between the latch receiving cavity 282 and the projection receiving opening 280. The opening 286 is positioned proximate the opposite side wall 278. The enlarged recess 284 has projections 285 which extend into the recess 284.

As shown in FIGS. 19 and 21, a latching mechanism 288 is positioned in the latch receiving cavity 282. The latching mechanism 288 has a securing portion engagement end 290 with a latching shoulder or wall 291 and an operator engagement end 922. The latching shoulder 291 of the securing portion engagement end 290 engages the securing shoulder 237 of the securing projection 235 of the projection 230 to securely position and maintain the mounting portion 252 and the clamp 250 to the projection 230 of the bracket 210. The latching mechanism 288 is configured to rotate in the latch receiving cavity 282 between a first or unlocked position (as shown in FIGS. 6 and 7) and a second or locked position (as shown in FIGS. 8 and 9), as will be more fully described.

Figure 16:
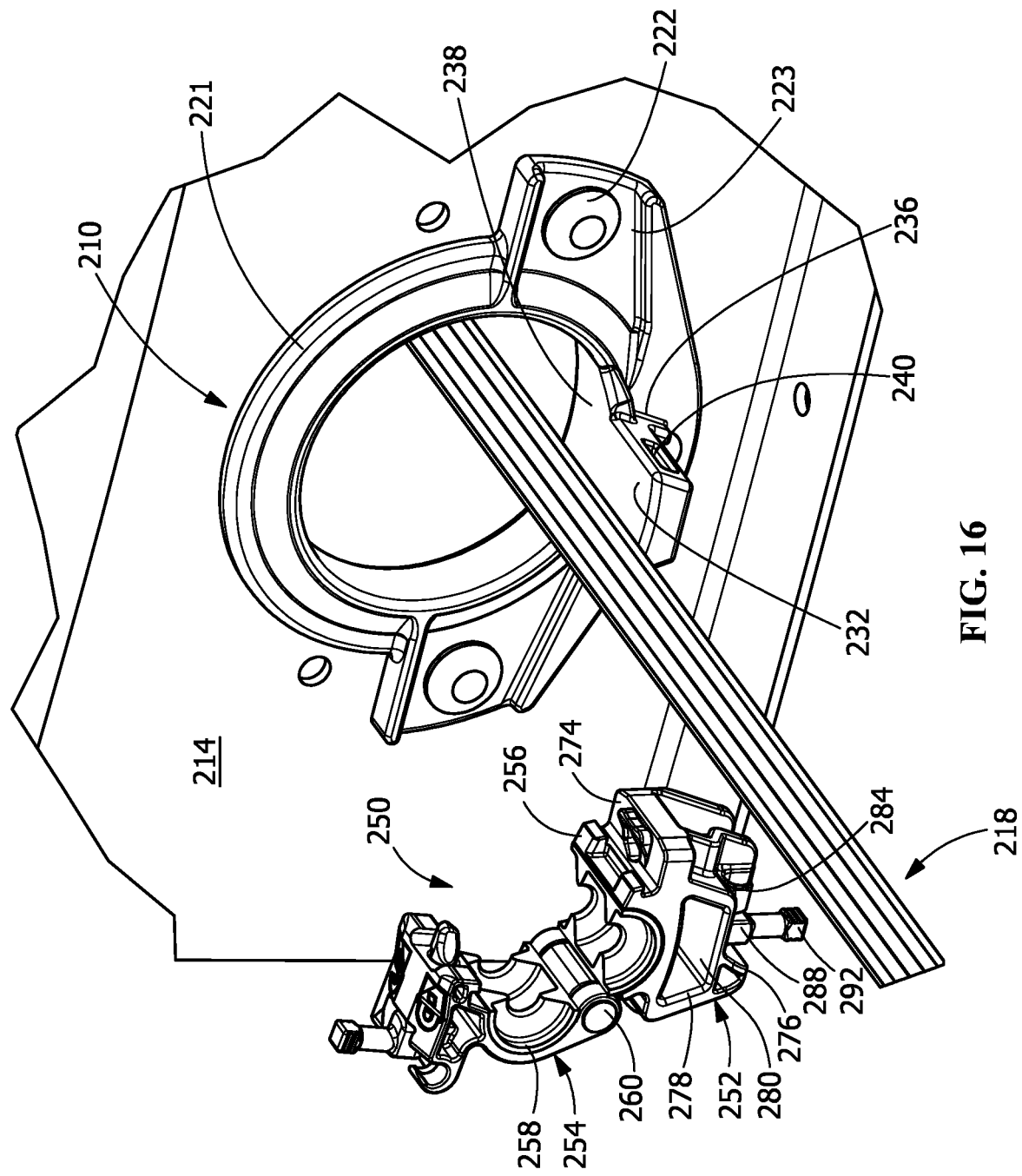
FIG. 16 is a perspective view of the cable inserted through the opening of the structural member and through the bracket with an illustrative clamp of the present invention shown in an initial or preinstalled position.
Figure 17:
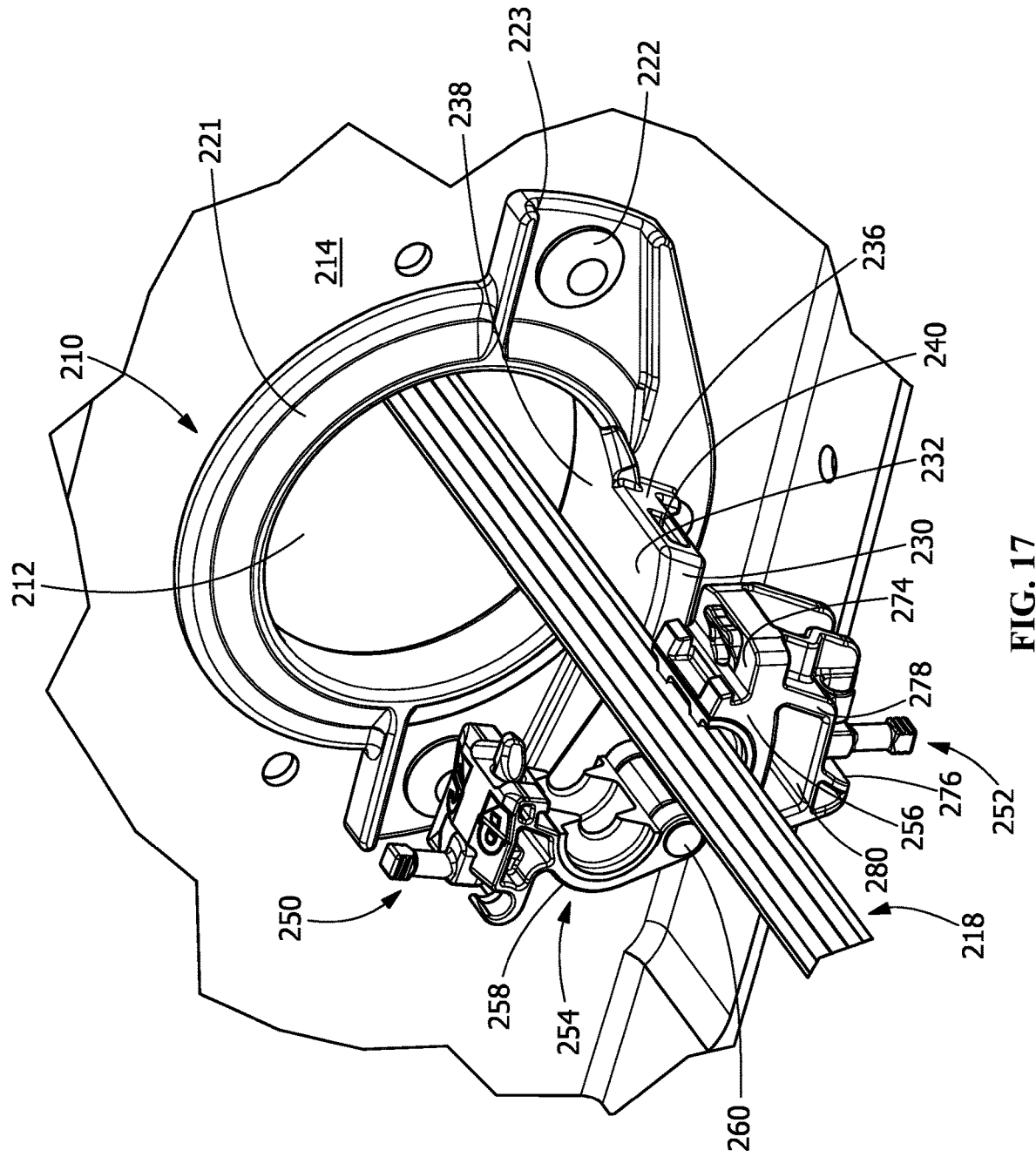
FIG. 17 is a perspective view of the cable inserted through the opening of the structural member and through the bracket with the clamp shown moved onto the cable.

In operation, the clamp 250 is provided proximate the component 218 after the component 218 has been inserted through the bracket 210, as shown in FIG. 16. The clamp 250, with the clamping portion 254 in the open position, is then moved onto the component 218, as shown in FIG. 17. In this position the latching mechanism 288 are in first or unlocked positions.

The clamp 250 is moved toward the structural member 214. As this occurs, the projection 230 of the bracket 210 enters the projection receiving opening 280 of the mounting portion 252 of the clamp 250, allowing the clamp to move the position shown in FIGS. 18 and 19.

Figure 18:
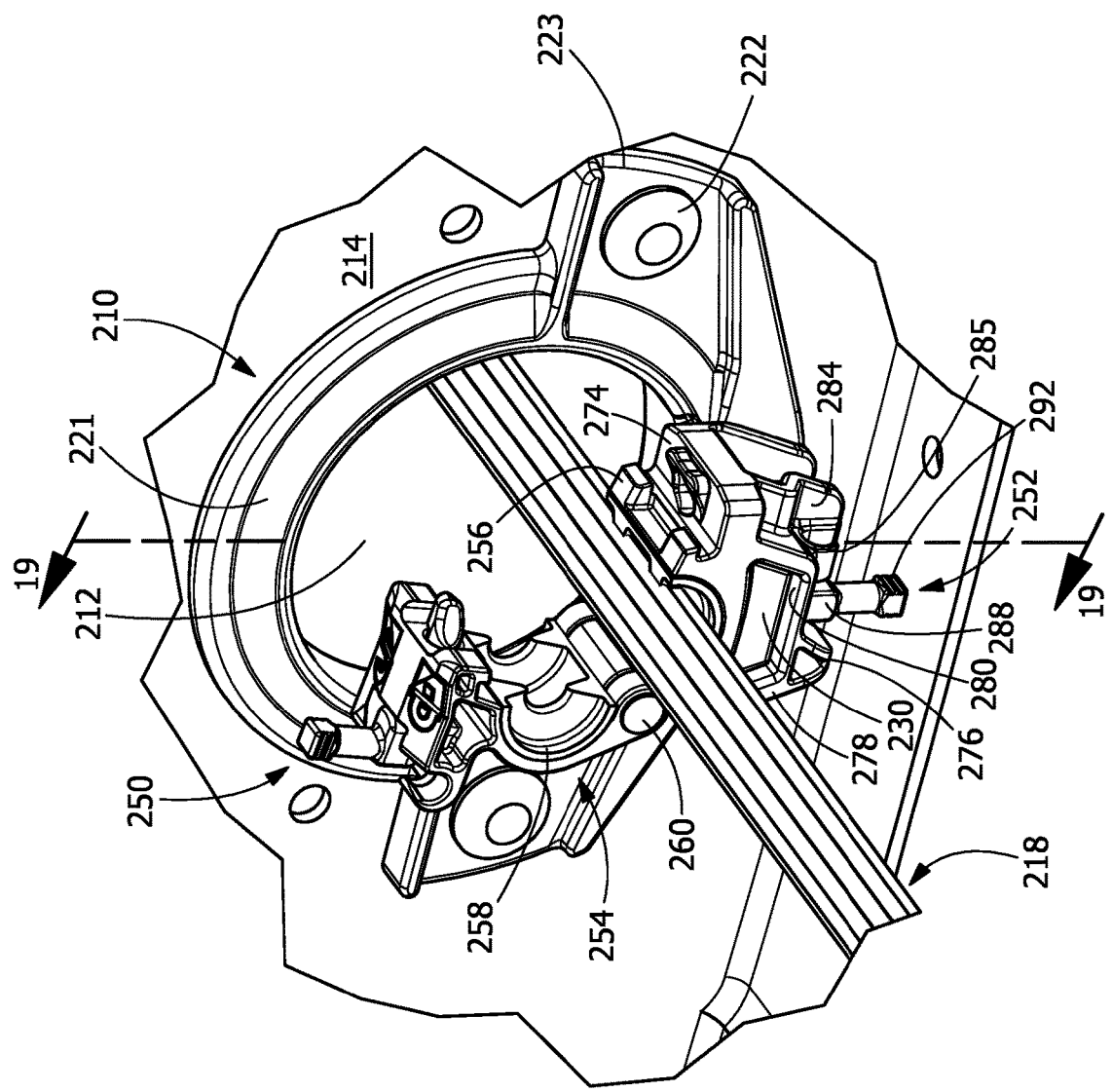
FIG. 18 is a perspective view of the cable inserted through the opening of the structural member and through the bracket with the clamp moved into engagement with the bracket, a latching mechanism of the mounting portion of the clamp is in an unlocked position.
Figure 20:
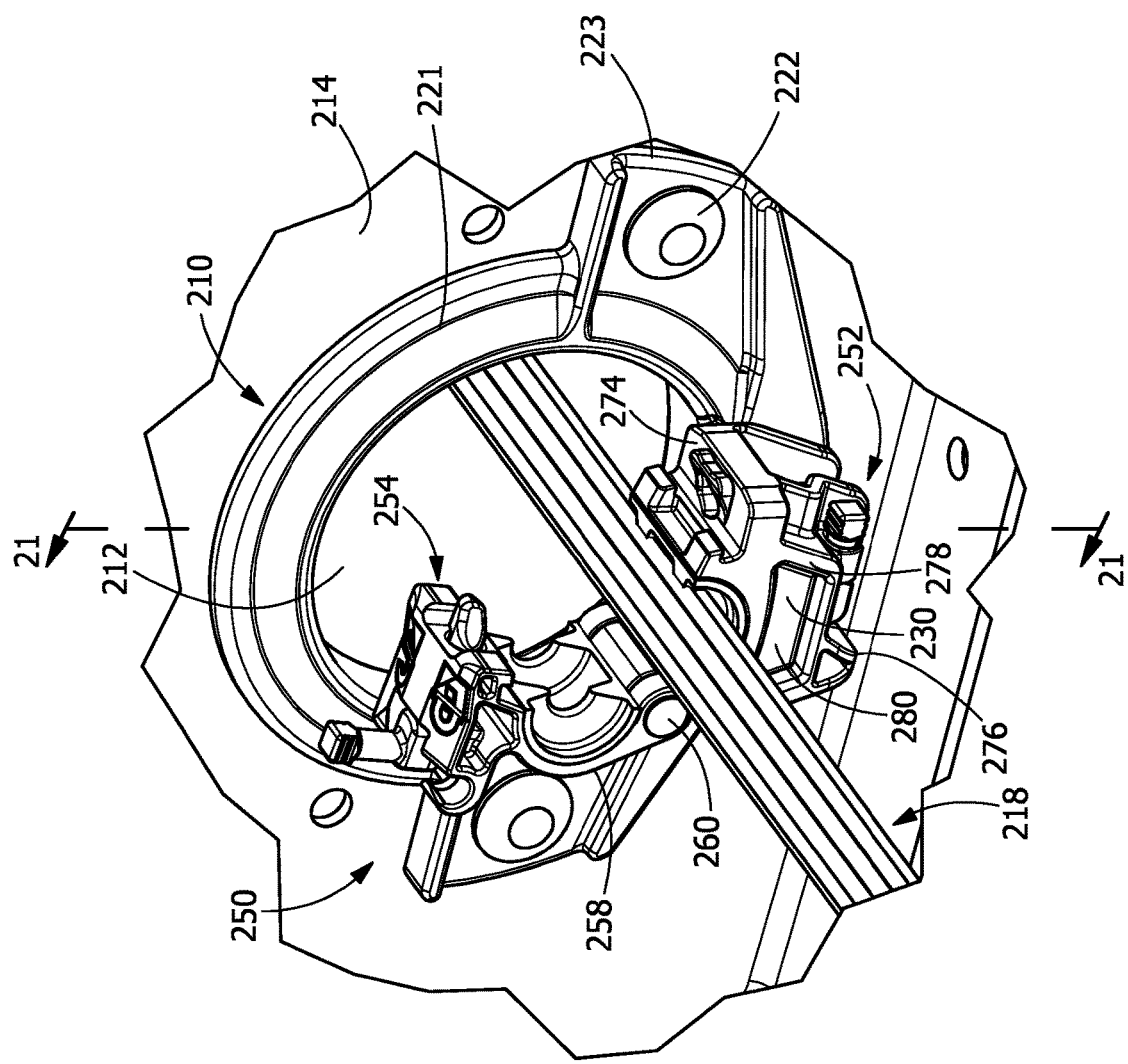
FIG. 20 is a perspective view of the cable inserted through the opening of the structural member and through the bracket with the latching mechanism of the mounting portion of the clamp moved to a locked position on the bracket.

With the clamp 250 properly positioned on the projection 230, the latching mechanism 288 is rotated in the latch receiving cavity 282 from the unlocked position, shown in FIGS. 18 and 19, to the locked position, shown in FIGS. 20 and 21. As the latching mechanism 288 is rotated, the latching shoulder 291 of the securing portion engagement end 290 of the latching mechanism 288 is moved in the opening 284 from the unlocked position, shown in FIG. 19, to the locked position, shown in FIG. 21. In the locked position, the latching shoulder 291 of the securing portion engagement end 290 engages the securing shoulder 237 of the securing projection 235 of the protrusion 230. As the securing shoulder 237 and the latching shoulder 291 are in engagement, the removal of the clamp 250 from the projection 230 of the bracket 210 is prevented.

As the rotation occurs, the operator engagement end 292 of the latching mechanism 288 is also moved from the unlocked position, shown in FIG. 18, to the locked position, shown in FIG. 20. In the locked position the operator engagement end 292 is positioned within the enlarged recess 284, the operator engagement end 292 engages and is placed in frictional engagement with the projections 285 which extend into the recess 284, thereby providing an interference fit between the operator engagement end 292 and the projections 285. The interference fit prevents the unwanted movement of the operator engagement end 292 and the latching mechanism 288 from the locked position to the unlocked position, such as, but not limited to, in environments in which the clamp 250 and bracket 210 are exposed to vibration. In addition, the positioning of the operator engagement end 292 in the enlarged recess 284 protects the operator engagement end 292 from unwanted and inadvertent engagement. The positioning of the operator engagement end 292 in the enlarged recess 284 also provides a visual and physical check to make certain that the clamp 250 is properly positioned and secured to the bracket 210.

Figure 22:
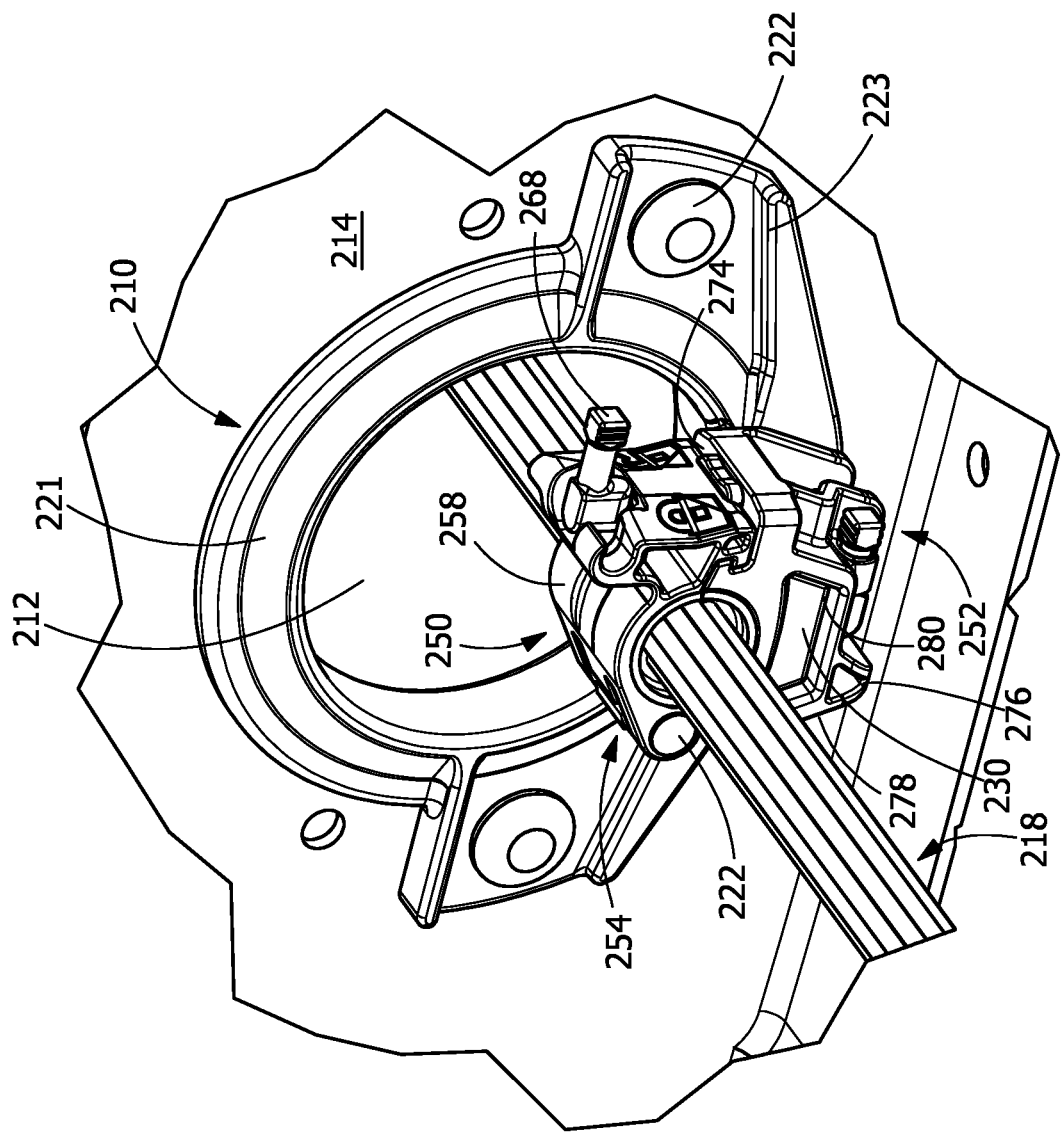
FIG. 22 is a perspective front view of a cable inserted through the opening of the structural member and through the bracket with the clamping portion of the clamp moved to the clamped position on the cable and a latching mechanism of the clamping portion of the clamp in an unlocked position.
Figure 23:
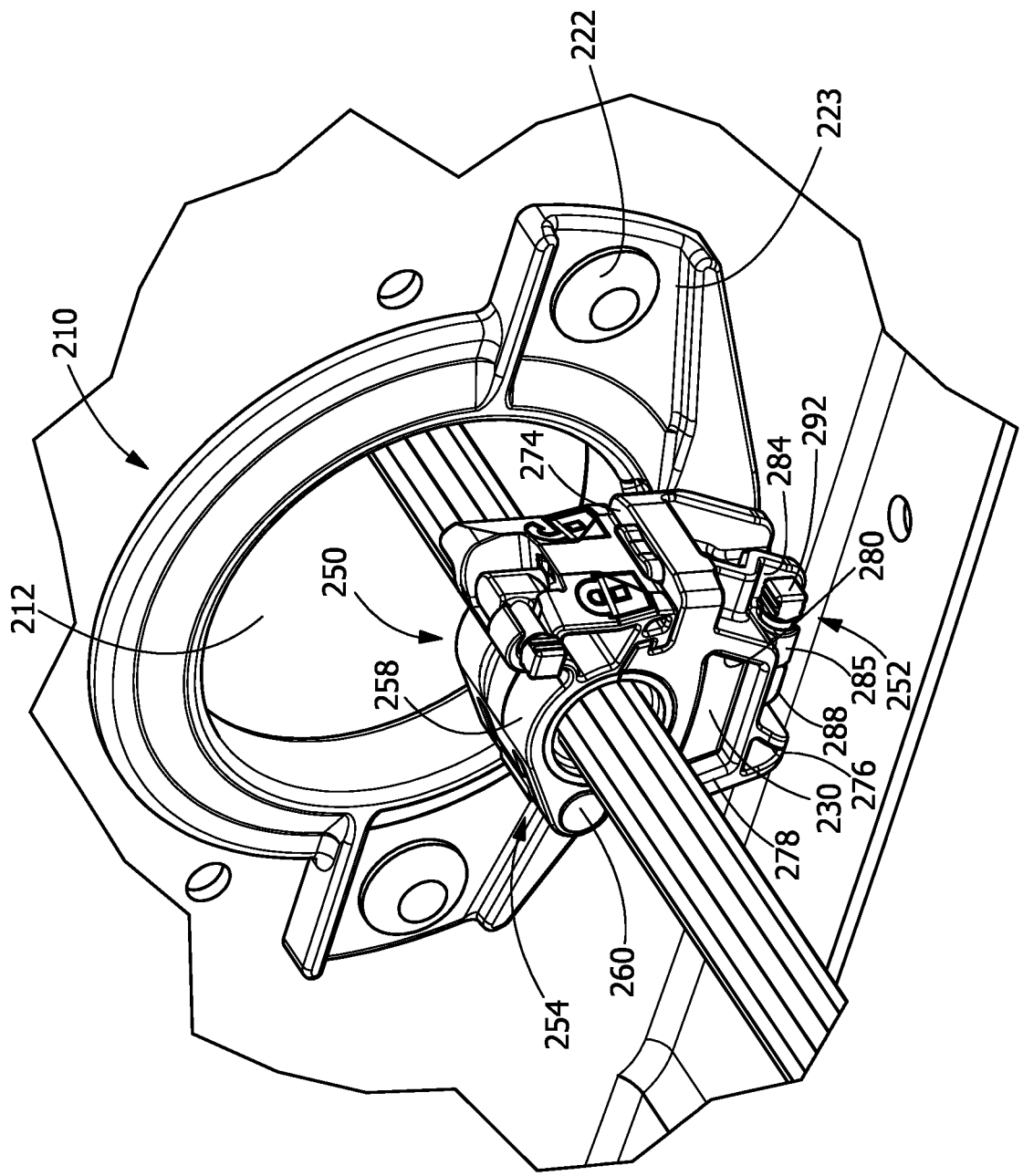
FIG. 23 is a perspective front view of a cable inserted through the opening of the structural member and through the bracket with the clamping portion of the clamp moved to the clamped position on the cable and a latching mechanism of the clamping portion of the clamp in a locked position.

With the clamp 250 properly locked to the bracket 210, the movable clamping arm 258 is rotated to the closed position, as shown in FIGS. 22 and 23. In this position, the clamping portion 254 is secured in the closed position, thereby securing the component 218 in the clamp 250.

Figure 24:
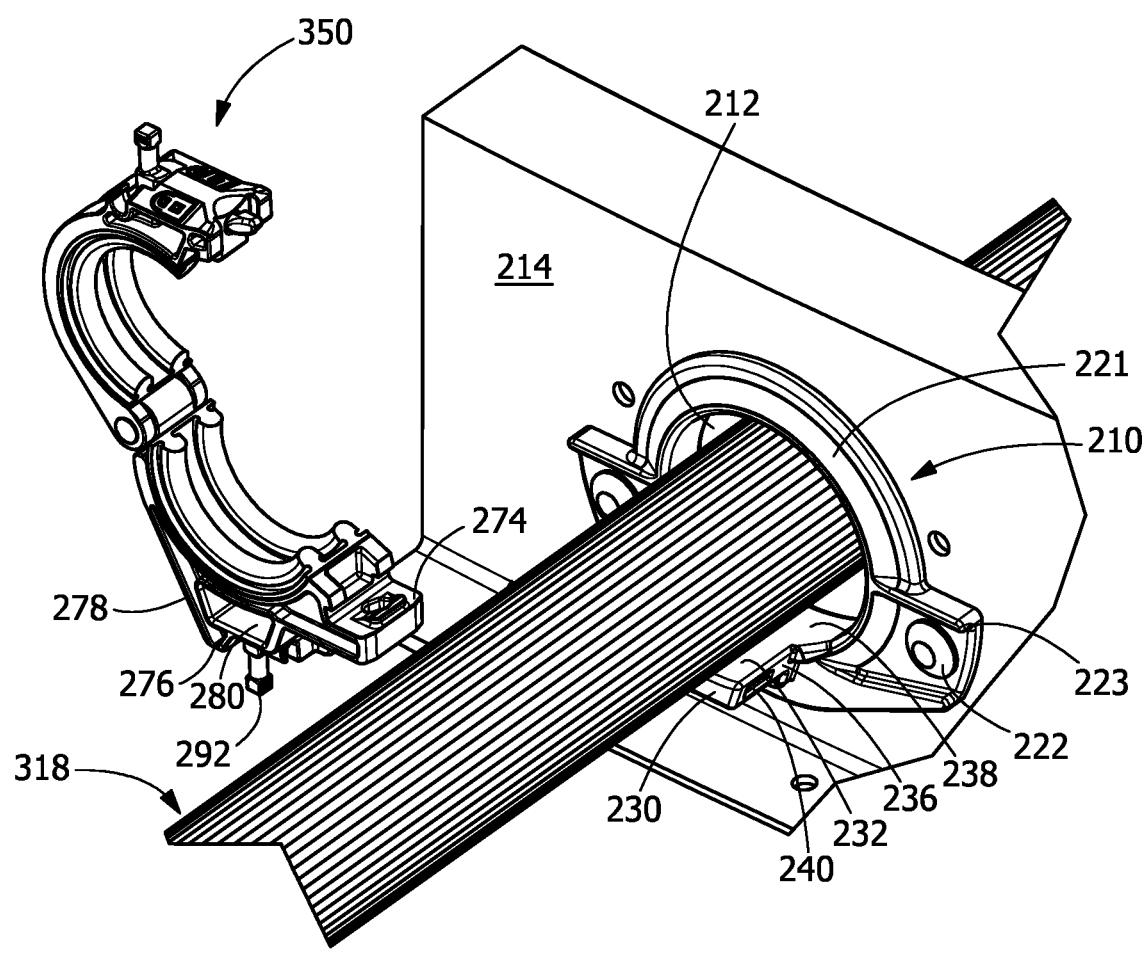
FIG. 24 is a perspective view of an alternate cable inserted through the opening of the structural member and through the bracket with an alternate illustrative clamp of the present invention shown in an initial or preinstalled position.
Figure 25:
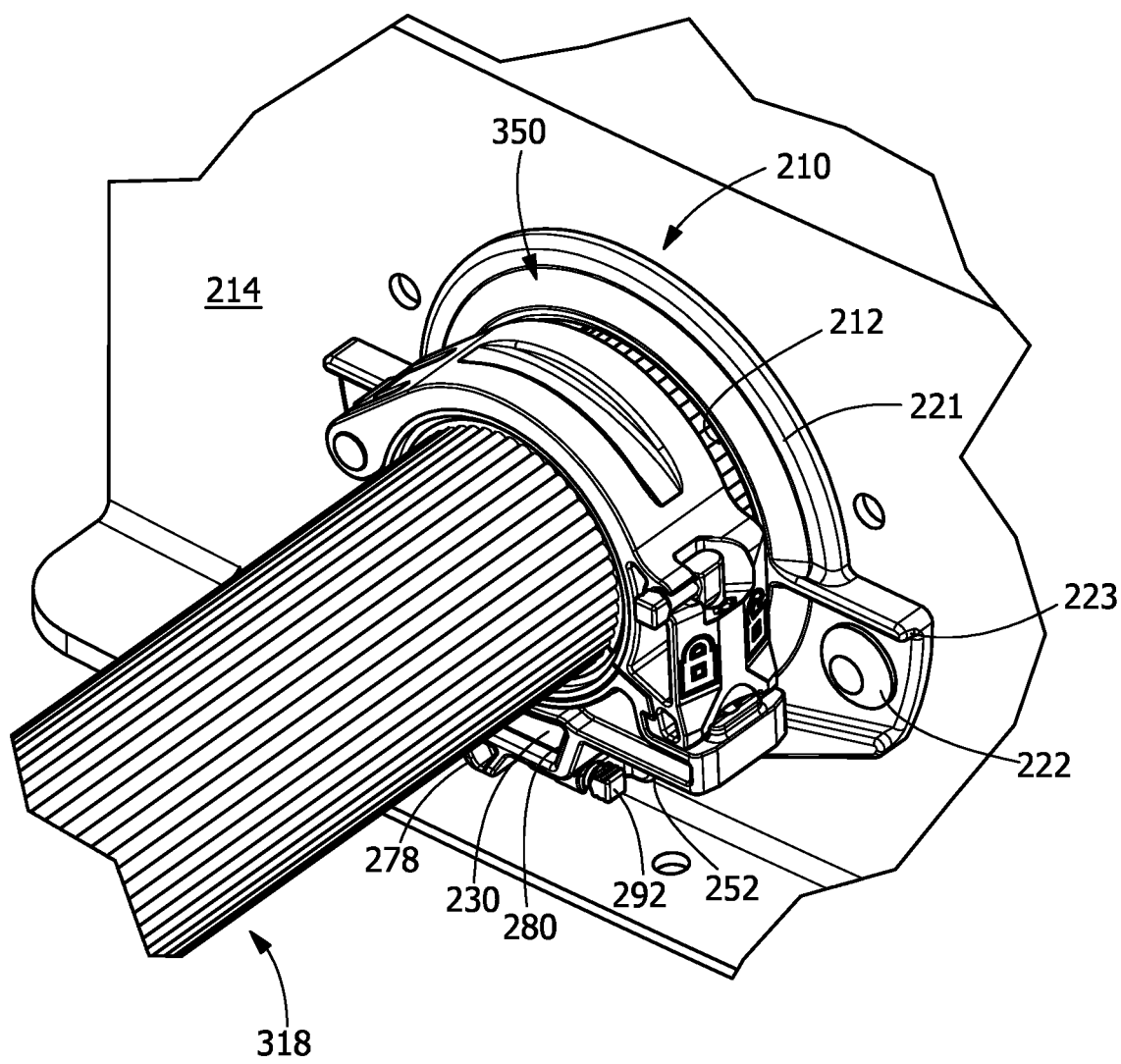
FIG. 25 is a perspective front view of the cable of FIG. 24 inserted through the opening of the structural member and through the bracket with the mounting portion of the clamp moved to a locked position on the bracket and the clamping portion of the clamp secured in the clamped position on the cable.

An alternative embodiment of a clamp is shown in FIGS. 24 and 25. In this embodiment the clamp 350 is larger to accommodate a larger cable or component 318. However, the operation of the clamp 350 is the same as described with respect to clamp 250.

The clamp 250, 350 provides a reliable means of securely fastening the component 218, 318, such as cable bundle, in a tool-less and fast to install manner, reducing the number of parts needed to be stocked. Additionally, the latching mechanism 288 ensures that the clamp 250, 350 is secure to the component 218, 318 and the bracket 210 and cannot vibrate loose.

Figure 26:
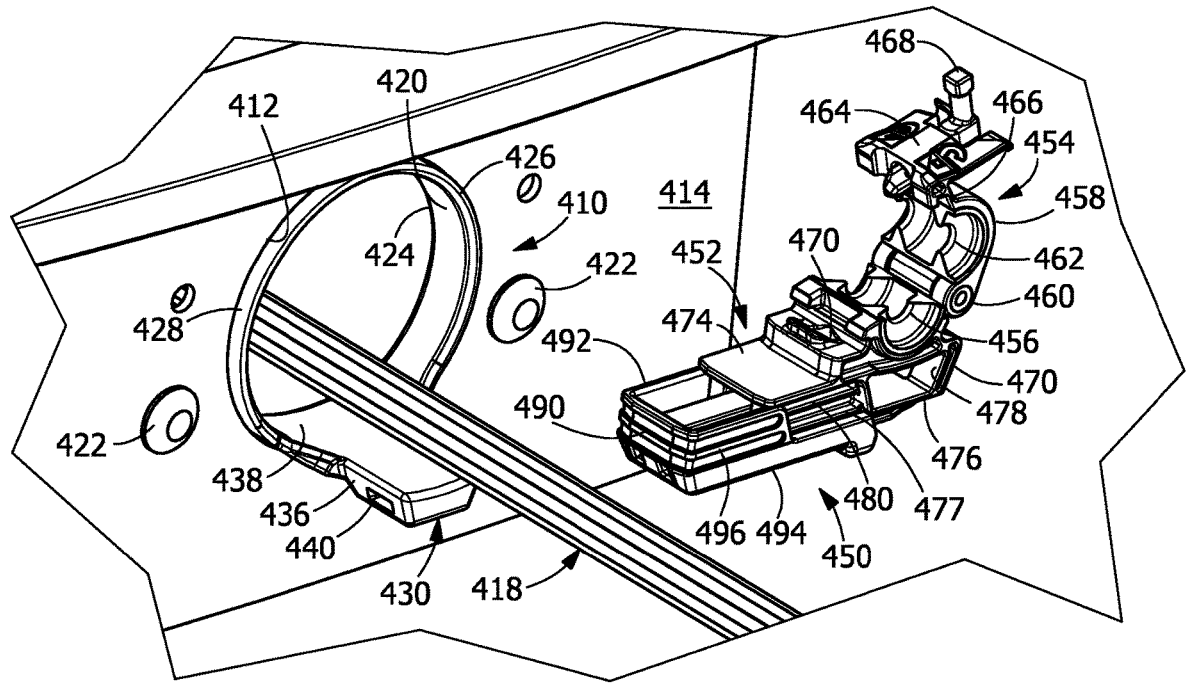
FIG. 26 is a perspective view of the cable inserted through the opening of the structural member and through the bracket with a clamp shown in an initial or preinstalled position.

Referring to FIG. 26, an alternate bracket 410 is shown in an opening 412 of a structural member 414. The bracket 410 may be of, for example, polymer material, thermoplastic material, composite material or metal. The opening 412 may be a lightening hole or other type of opening. The structural member 414 may be, but is not limited to, a frame or bulkhead of a vehicle, a beam or a bulkhead of an aircraft, or a beam of a building. The opening 412 may be formed in various ways, such as by stamping, cutting, punching and the like. The opening 412 has a side wall or edge which can abrade or cut or otherwise damage components 18 extending through the opening 412. The components 18 may be, but are not limited to cables or cable bundles.

The bracket 410 includes a circular section or grommet portion 420 which is fastened to the structural member 414 by means of fastening members 422, such as, but not limited to, rivets. The bracket 410 is fastened to the structural member 414 to prevent the rotation of the bracket 410 relative to the structural member 414. A flange and structural plate (not shown) are disposed at a first end 424 of the grommet portion 420. The flange cooperates with the structural member 414 to properly position the grommet portion 420 relative to the structural member 414. The structural plate cooperates with the fastening members 422 to retain the grommet portion 420 to the structural member 414. An axis of opening 412 is perpendicular to the plane of the structural plate. A second end 426 of the grommet portion 420 does not include a flange.

The grommet portion 420 has a circular lateral cross section. However, the grommet portion 420 may have other configurations, such as, but not limited to, an oblong lateral cross section without departing from the scope of the invention. An outer surface 428 of the grommet portion 420 is shaped and sized to suitably fit the opening 412, such that the outer surface 428 is proximate to or in engagement with the side wall of the opening 412. The circular grommet portion 420 is formed to fit inside the opening 412 in the structural member 414, and the grommet portion 420 is of sufficient length to ensure that the components 18 do not come into contact with the side wall of the structural member 414. The bracket 410 is configured to support components 18 and protect them from the side wall or edges of the structural member 414 to which the bracket 410 is mechanically fixed.

A projection or protrusion 430 extends from the second end 426 of the grommet portion 420 in a direction away from the first end 424. The projection 430 has a top or cable support wall 432, and oppositely facing bottom wall 434 and side walls 436 which extend between the cable support wall 432 and the bottom wall 434. The cable support wall 432 is positioned in line with an inner surface 438 of the grommet portion 420. A mounting opening 440 extends through the projection 430 in a direction which is essentially parallel to the cable support wall 432. The opening 440 extends through the side walls 436.

Referring to FIGS. 26 through 37, an alternate cable clamp or clamp 450 may be used to secure the component 418 to the bracket 410 and to the structural member 414. In the illustrative embodiment shown, the clamp 450 has a mounting portion 452 and a clamping portion 454. The clamping portion 454 has a fixed clamping arm 456 and a movable clamping arm 458 which pivots about pivot member 460 between and open position and a closed or clamped position. The movable clamping arm 458 has a compressible or resilient member 462 which is provided on an inside portion of the movable clamping arm 458. The compressible or resilient member 462 cooperates with the component 418 when the component 418 is positioned between the fixed clamping arm 456 and the movable clamping arm 458 and the movable clamping arm 458 is moved to the closed position. The fixed clamping arm 456 extends from and is attached to the mounting portion 452. In the illustrative embodiment, the clamping portion 454 is a P-clamp, but other types of clamps can be used. The clamping portion 454 may be configured to cooperate with different sized components. For example, when in the closed or clamped position the clamping portion may have a diametrical range of: 3.175-6.35 mm; 6.35-9.525 mm; 9.525-312.7 mm; 12.7-15.875 mm; 15.875-19.05 mm; 19.05-22.2 mm; or 22.2-25.4 mm.

A latching mechanism 464 extends from the movable clamping arm 458 proximate a free end of the movable clamping arm 458. The latching mechanism 464 has a mounting portion engagement end 466 and an operator engagement end 468. The mounting portion engagement end 466 engages a movable clamping arm engagement portion 470 of the mounting portion 452 to securely position and maintain the movable clamping arm 458 in the closed position.

The mounting portion 452 has a base 472 with a top wall 474, a bottom wall 476 and side walls 477 which extend between the top wall 474 and the bottom wall 476. A projection receiving opening 478 extends through the base 472 from one side wall 477 to an opposite side wall 477. The opening 478 is dimensioned to receive the projection 430 therein. The opening 478 is configured to have a similar, but slightly larger configuration than the projection 430 to allow the projection 430 to be inserted into the opening 478, while preventing the unwanted movement of the clamp 450 relative to the bracket 410.

Recesses 480 are provided on the side walls 477. The longitudinal axis of the recesses 480 extend in a direction which is essentially parallel to the plane of the top wall 474. The recesses 480 extend from proximate the opening 478 to proximate an end wall 482 (FIGS. 33, 35 and 36) of the mounting portion 452.

Figure 33:
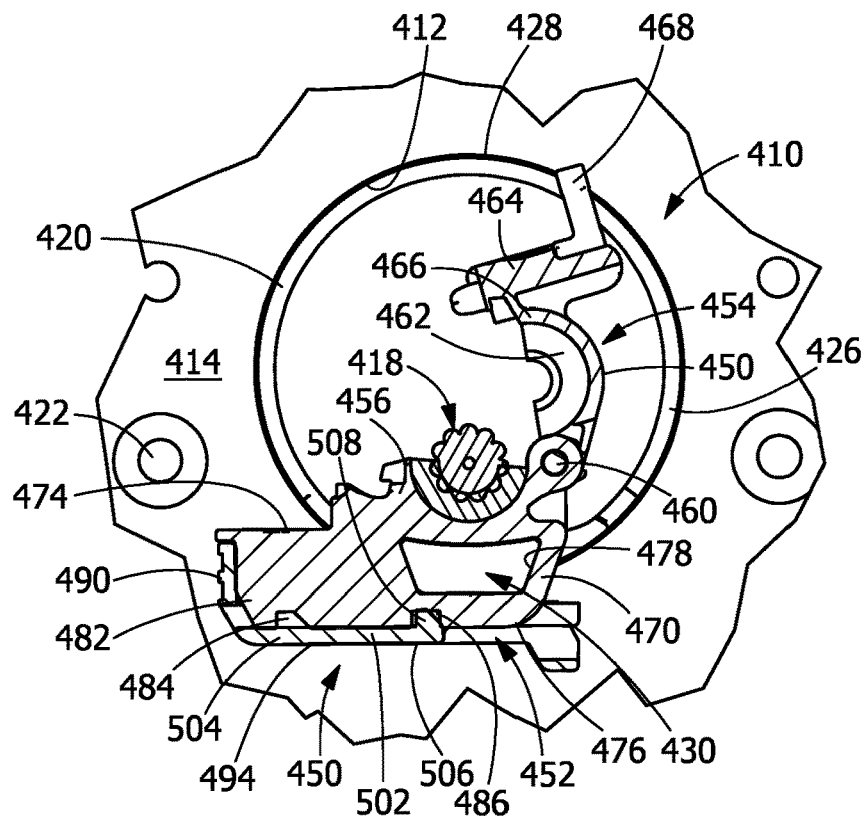
FIG. 33 is a cross-sectional view of the clamp shown in FIG. 32.
Figure 35:
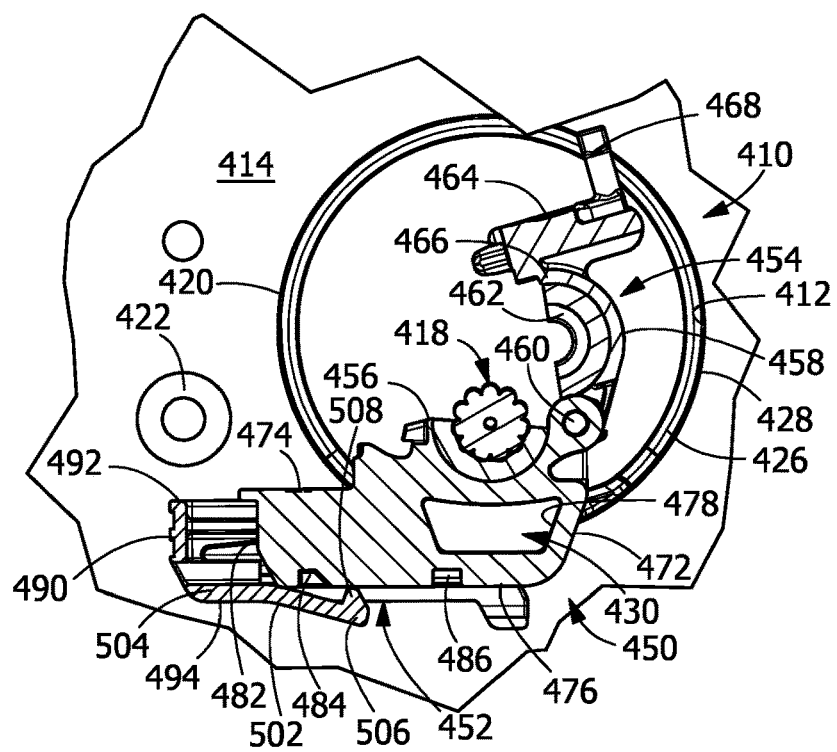
FIG. 35 is a cross-sectional view of the clamp similar to FIG. 32, with the clamp shown between the unlocked position and a locked position.
Figure 36:
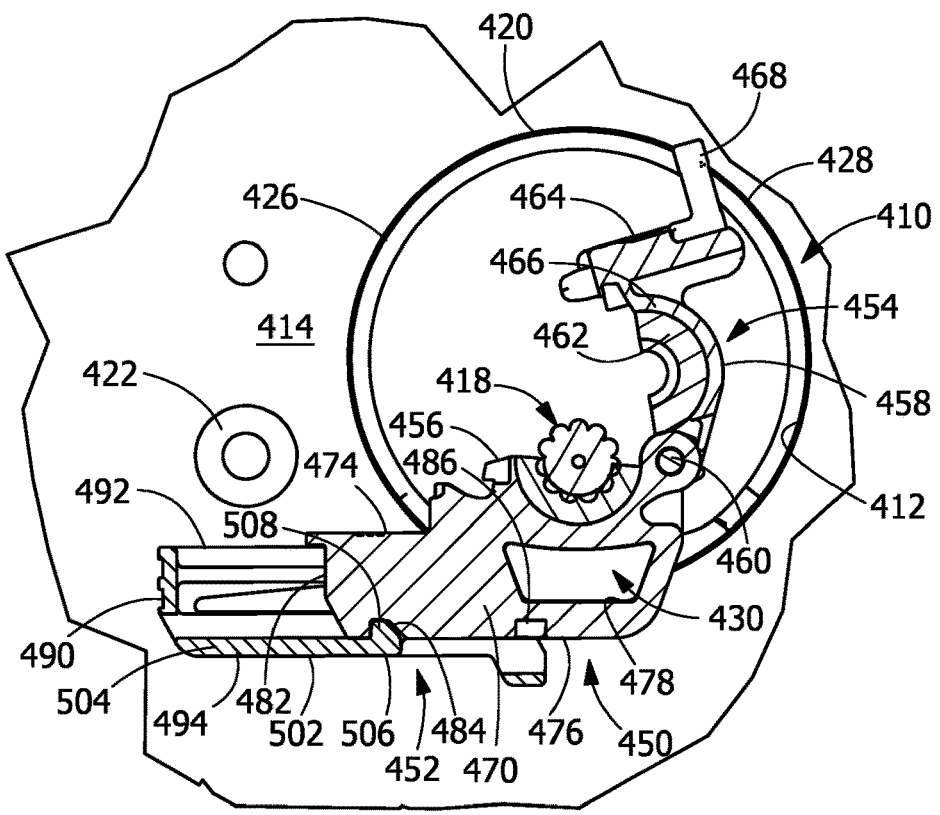
FIG. 36 is a cross-sectional view of the clamp similar to FIG. 32, with the clamp shown in the unlocked position.

Referring to FIGS. 33, 35 and 36, a first recess or cavity 484 is provided in the bottom wall 476. The first cavity 484 is provided proximate the end wall 482. A second recess or cavity 486 is provided in the bottom wall 476. The second cavity 486 is spaced from the first cavity 484 and is provided proximate the opening 478.

The mounting portion 452 has a slidable locking member 490. The slidable locking member 490 has a top wall 492, a bottom wall 494 and side walls 496 which extend between the top wall 492 and the bottom wall 494.

Projections 500 extend from each side wall 496 inwardly toward the opposite side wall 496. The projections 500 are dimensioned to be received in the recesses 480 of the base 472. The projections 500 may be dimples or have other configurations.

A latching arm 502 is provided on the bottom wall 494. The latching arm 502 has a base 504, which is attached to the bottom wall 494, and a free end 506. The free end 506 has a latching projection 508. The latching arm 502 is configured to allow the free end 506 to be resiliently displaced relative to the base 504.

Figure 34:
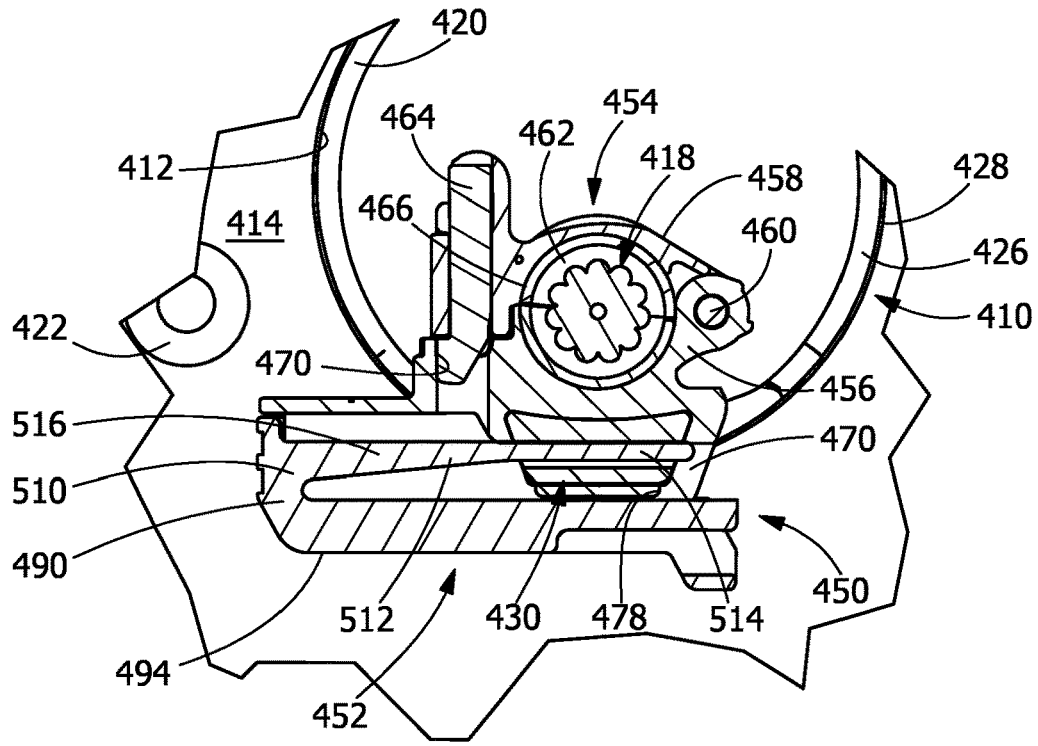
FIG. 34 is a center line cross-sectional view of the clamp of FIG. 31, with the clamp shown in the locked position.

As shown in FIG. 34, a securing arm 512 extends from an end wall 510 of the slidable locking member 490. The securing arm 512 is provided between the side walls 496. The securing arm 512 has a free end 514 which is configured to be received in the mounting opening 440 of the projection 430. The securing arm 512 has a tapered configuration 516 proximate the end wall 482 to provide structural integrity to the securing arm 512.

Figure 27:
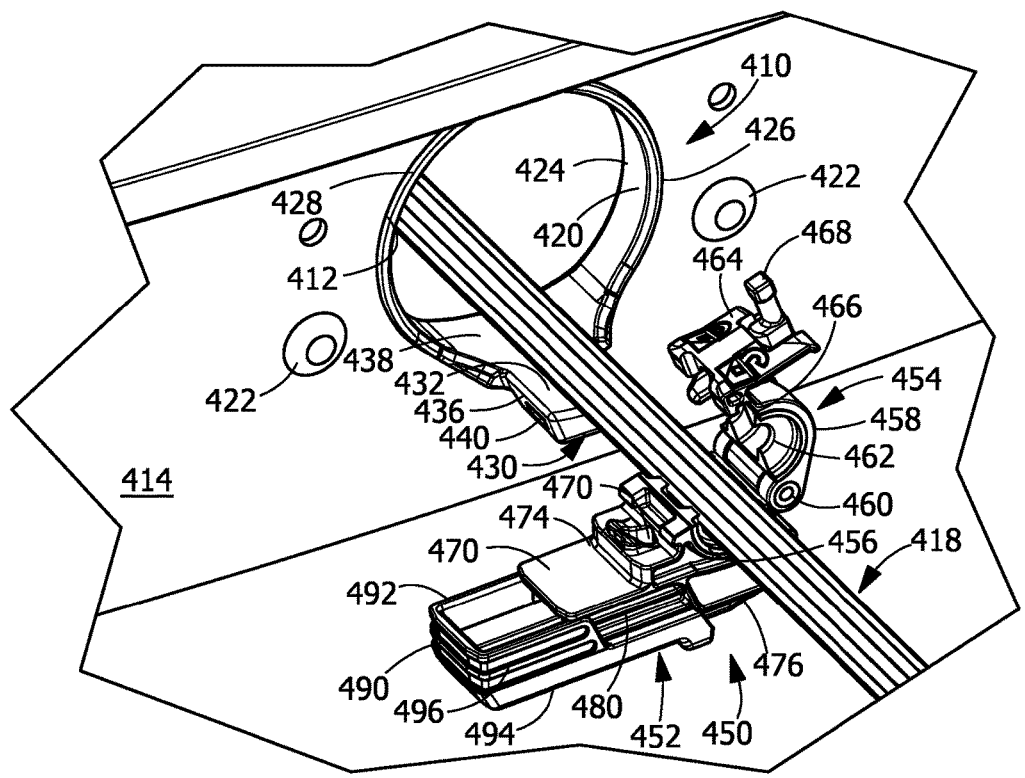
FIG. 27 is a perspective view of the cable inserted through the opening of the structural member and through the bracket with the clamp shown moved onto the cable.
Figure 28:
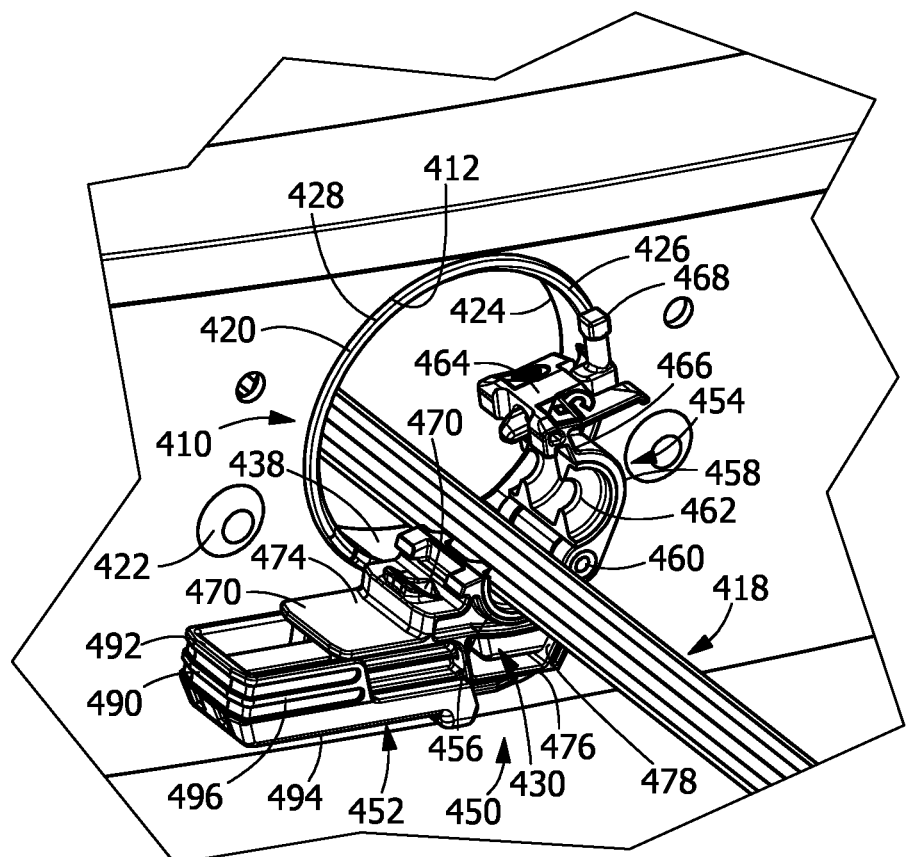
FIG. 28 is a perspective view of the cable inserted through the opening of the structural member and through the bracket with the clamp moved into engagement with the bracket, the clamp is in an unlocked position.
Figure 29:
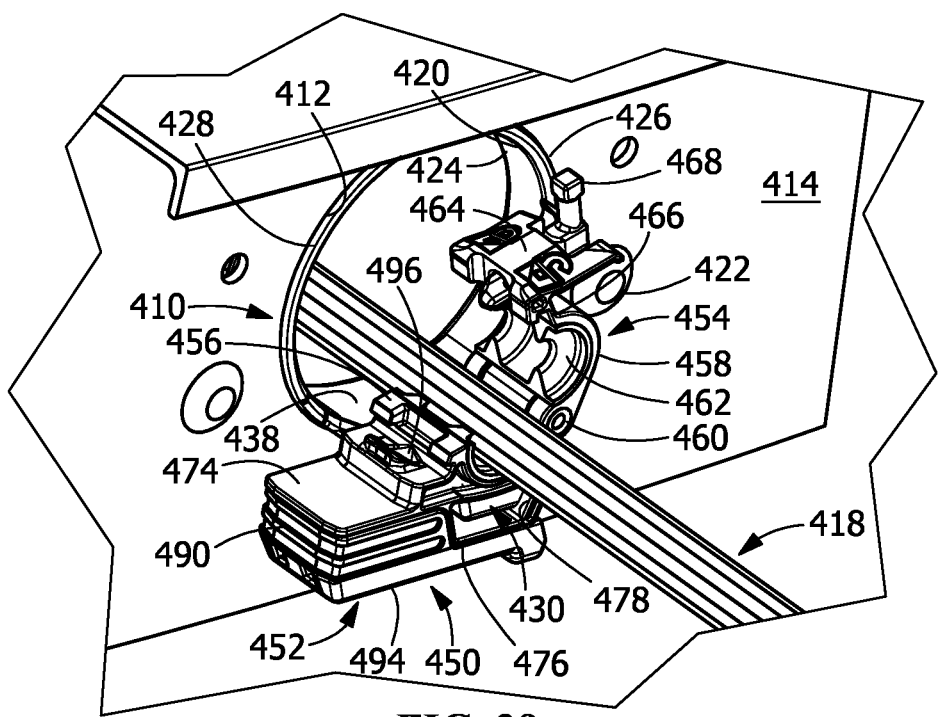
FIG. 29 is a perspective view of the cable inserted through the opening of the structural member and through the bracket with the clamp moved to a locked position on the bracket.

In operation, the clamp 450 is provided proximate the component 418 after the component 418 has been inserted through the bracket 410, as shown in FIG. 26. The clamp 450, with the clamping portion 454 in the open position, is then moved onto the component 418, as shown in FIG. 27. In this position, the slidable locking member 490 is positioned in an unlocked position. The slidable locking member 490 is retained in the unlocked position by the engagement of the latching projection 508 of the latching arm 102 with the first cavity 484 of the bottom wall 476 of the base 472, as shown in FIGS. 36 and 37.

The clamp 450 is moved toward the structural member 414. As this occurs, the projection 430 enters the projection receiving opening 478 of the base 472 of the mounting portion 452 of the clamp 450, allowing the clamp to move the position shown in FIG. 28.

Figure 32:
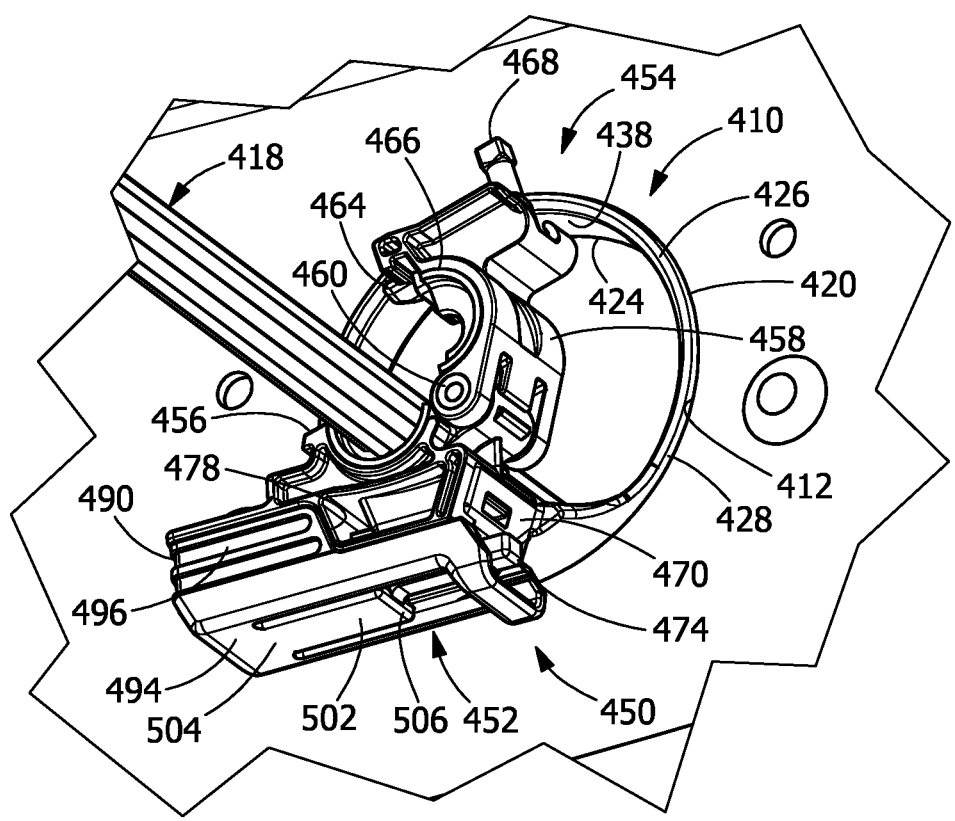
FIG. 32 is a perspective view of the clamp moved into engagement with the bracket, as shown in FIG. 29, the clamp shown in the locked position.
Figure 37:
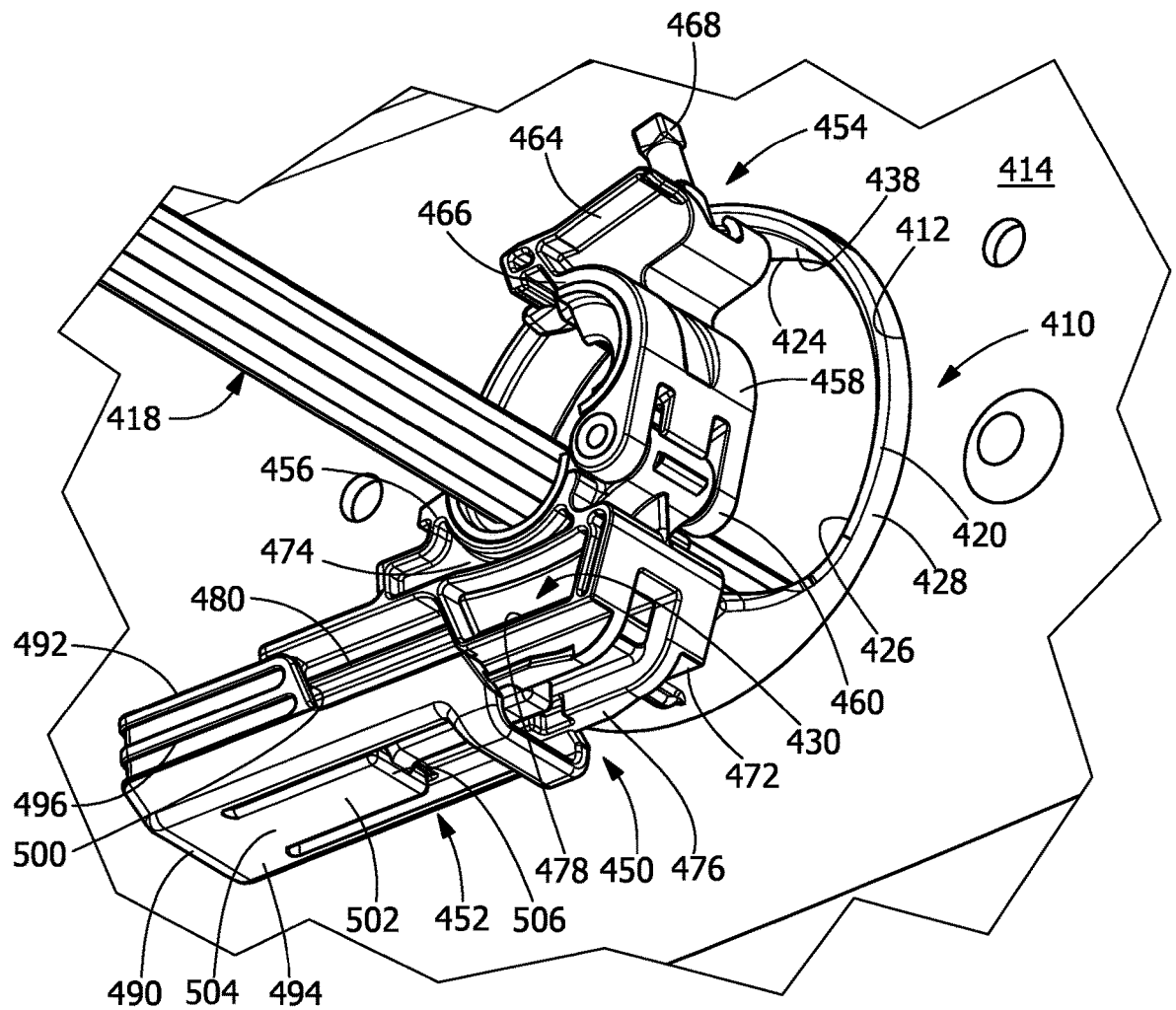
FIG. 37 is a perspective view of the clamp moved into engagement with the bracket, as shown in FIG. 28, the clamp shown in the unlocked position.
Figure 38:
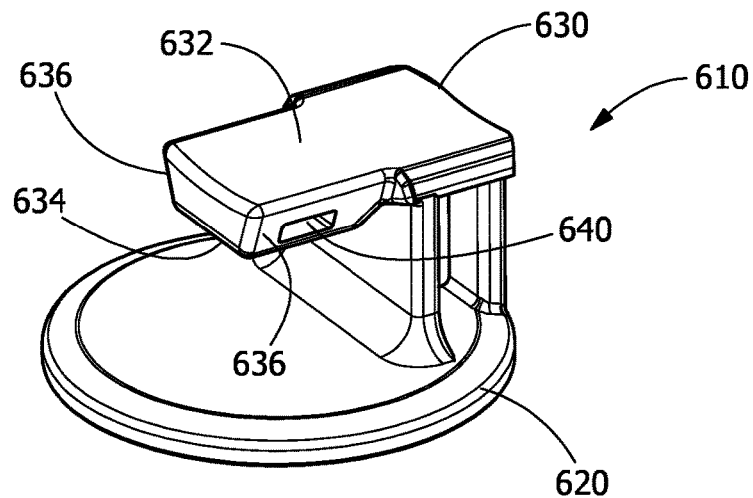
FIG. 38 is a perspective view of an alternate illustrative bracket for use with the clamp.
Figure 39:
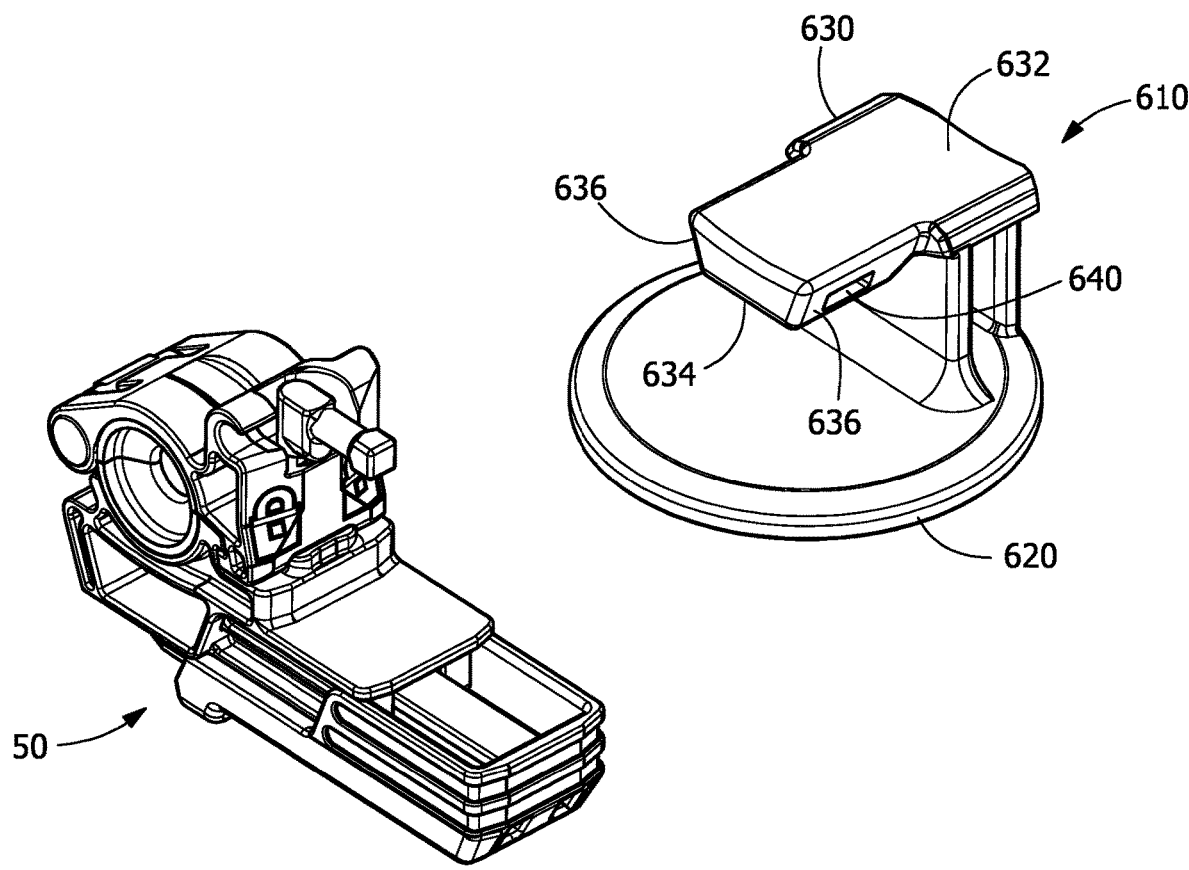
FIG. 39 is a perspective view of the bracket of FIG. 38 with an illustrative clamp shown in an initial or preinstalled position.
Figure 40:
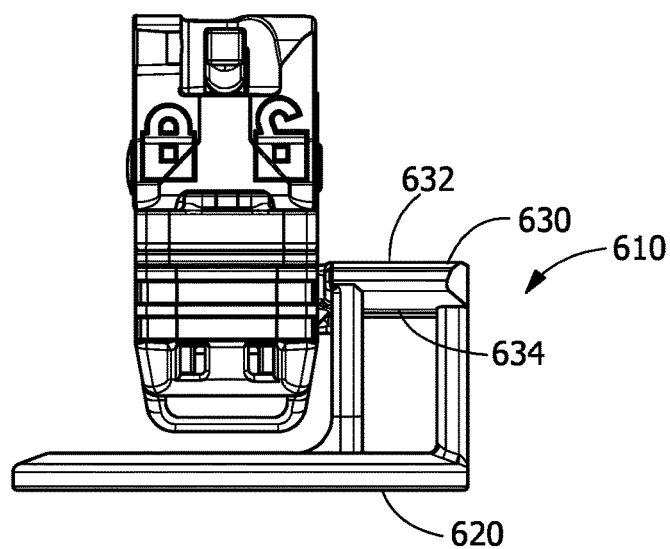
FIG. 40 is a side view of the clamp of FIG. 39 mounted to the bracket.
Figure 41:
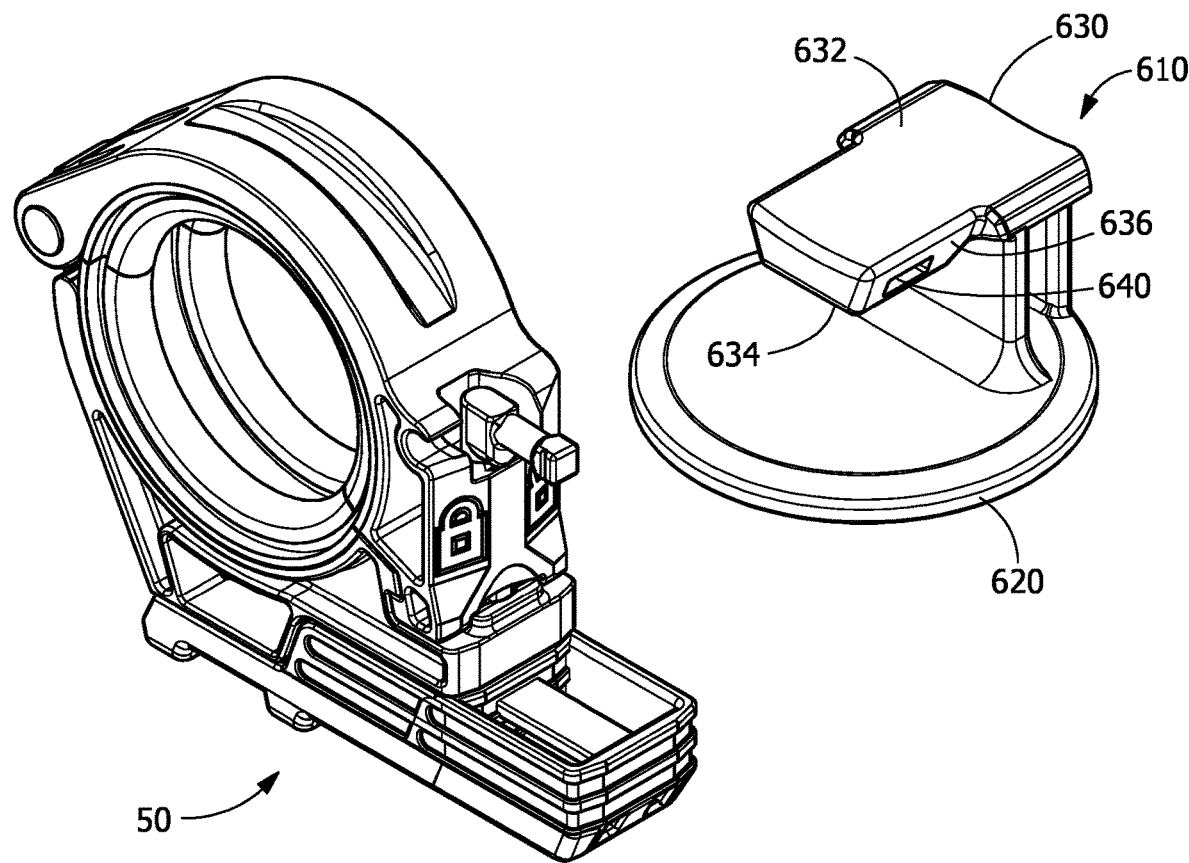
FIG. 41 is a perspective view of the bracket of FIG. 38 with a second illustrative clamp shown in an initial or preinstalled position.
Figure 42:
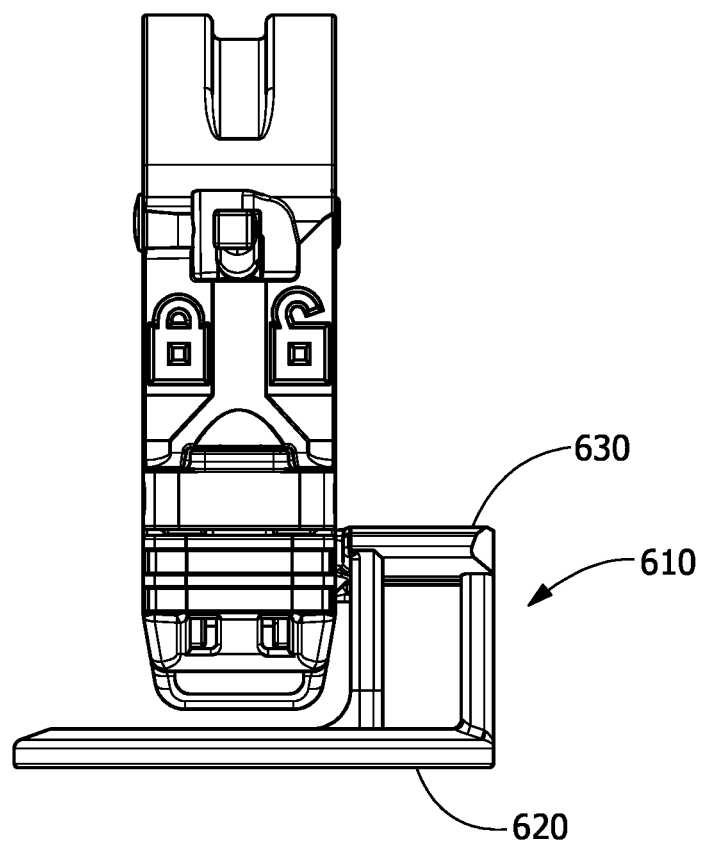
FIG. 42 is a side view of the clamp of FIG. 41 mounted to the bracket.

With the clamp 450 properly positioned on the projection 430, the slidable locking member 490 is moved from the unlocked position shown in FIGS. 36 and 37 to the locked position shown in FIGS. 32, 33 and 34. As the slidable locking member 490 is moved, the latching projection 508 of the latching arm 502 moves out of the first cavity 484 of the bottom wall 476 and slides across the bottom wall 476, as shown in FIG. 35. As this occurs, the projections 500 of the side walls 496 slide in the recesses 480 of the base 472. In addition, the securing arm 512 is moved into the mounting opening 440 of the projection 430.

This continues until the latching projection 508 of the latching arm 502 are moved into the second cavity 486, placing the slidable locking member 490 in the locked position, as shown in FIGS. 29, 32, 33 and 34. In the locked position, as shown in FIG. 34, the securing arm 512 is fully inserted into the mounting opening 440 of the projection 430, thereby securing the clamp 450 to the bracket 410. The slidable locking member 490 acts as a secondary lock to provide a visual and physical check to make certain that the clamp 450 is properly positioned and secured to the bracket 410.

Figure 30:
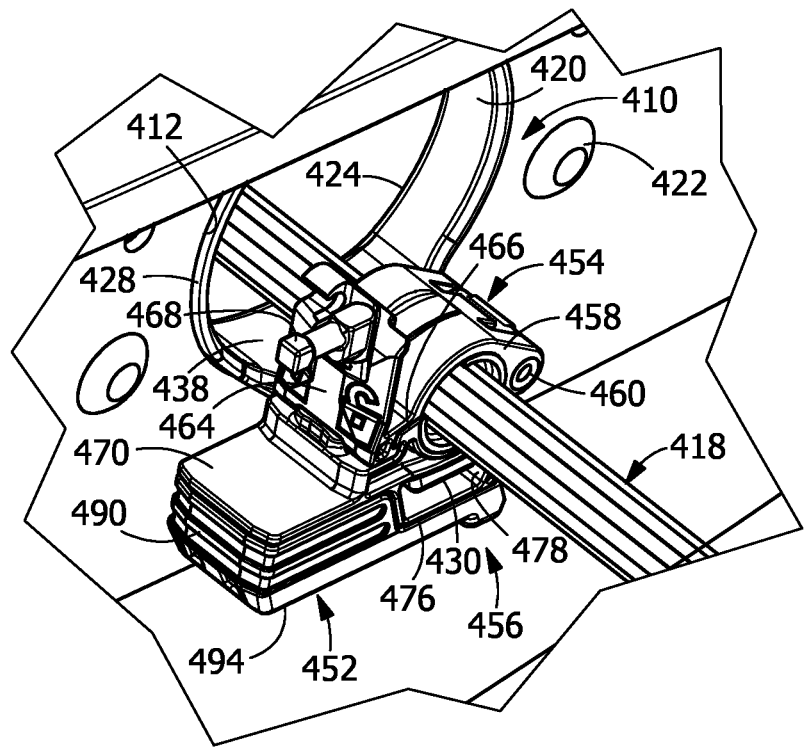
FIG. 30 is a perspective front view of a cable inserted through the opening of the structural member and through the bracket with the clamp moved to the clamped position on the cable.
Figure 31:
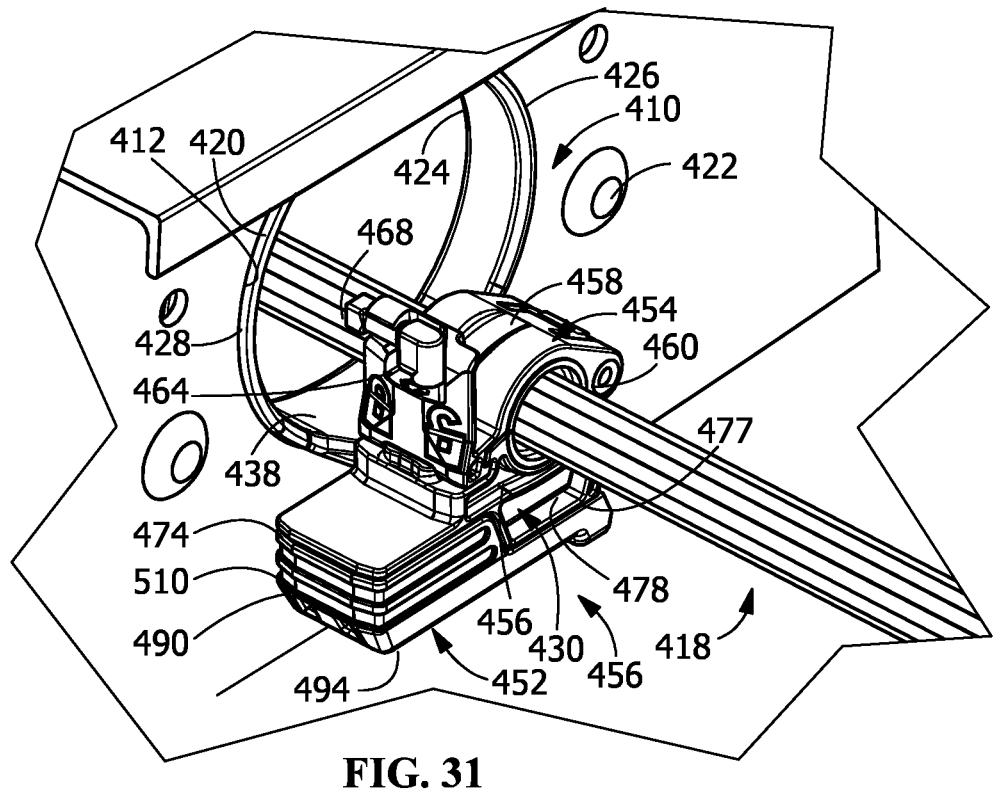
FIG. 31 is a perspective front view of a cable inserted through the opening of the structural member and through the bracket with the clamp secured in the clamped position on the cable.

With the clamp 450 properly locked to the bracket 410, the movable clamping arm 458 is rotated to the closed position, as shown in FIG. 30. The operator engagement end 468 of the latching mechanism 464 is engaged and the latching mechanism 464 is rotated to the position shown in FIG. 31. In this position, the clamping portion 454 is secured in the closed position, thereby securing the component 418 in the claim 450.

The clamp 450 provides a reliable means of securely fastening the components, such as cable bundles, in a tool-less and fast to install manner, reducing the number of parts needed to be stocked. Additionally, the slidable locking member 490 ensures that the clamp 450 is secure to the bracket 410 and cannot vibrate loose.

The clamp 450 can be installed in the orientation shown or can be rotated 180 degrees. Once positioned on the bracket 410, the clamp 450 and bracket 410 are fixed rotationally relative to the structural member 414.

Referring to FIGS. 38 through 42, an alternate illustrative bracket 610 is shown. The bracket 610 may be of, for example, polymer material, thermoplastic material, composite material or metal. The bracket 610 includes a base portion 620. The base portion 620 has a circular lateral cross section. However, the base portion 620 may have other configurations, such as, but not limited to, an oblong lateral cross section without departing from the scope of the invention.

A projection or protrusion 630 extends base portion 620. The projection 630 has a top wall 632, and oppositely facing bottom wall 634 and side walls 636 which extend between the top wall 632 and the bottom wall 634. A mounting opening 640 extends through the projection 630 in a direction which is essentially parallel to the top wall 632. The opening 640 extends through the side walls 636. Clamps 450 of varying sizes may be mounted to the projections 630 of the bracket 610. As the illustrative clamp 450 shown in FIGS. 39 through 42 is inserted onto the projections 630 and operate in a similar manner to the clamp 450 previously described, the detailed description will not be repeated.

While the various illustrative brackets are shown, the brackets may have different configuration and may be used in different applications without departing from the scope of the application. Additionally, different configurations of the clamp 450 may be used without departing from the scope of the invention. The brackets and clamp are shown to illustrate a tool free and hardware free attachment system which can be quickly mounted and secured.

While the invention has been described with reference to a preferred embodiment, it will be understood by those skilled in the art that various changes may be made, and equivalents may be substituted for elements thereof without departing from the spirit and scope of the invention as defined in the accompanying claims. One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. A mounting system for mounting to a structural component, the mounting system comprising:
    a bracket with a mounting projection, the mounting projection having a mounting opening which extends between side walls of the mounting projection;
    a clamp having a mounting portion and a clamping portion, the mounting portion having a projection receiving opening which receives the mounting projection therein the mounting portion having a securing opening which extends through side walls of the mounting portion;
    a latching mechanism extending from the clamping portion, the latching mechanism having a securing portion which is movable between an unlocked position in which the securing portion is removed from the mounting opening, and a locked position, in which the securing portion is positioned in the mounting opening.

2. The mounting system as recited in claim 1, wherein the mounting portion has a front wall, a back wall, and side walls, the projection receiving opening extends through the mounting portion from one side wall to an opposite side wall.

3. The mounting system as recited in claim 2, wherein a latch receiving cavity is provided in the front wall of the mounting portion, the latch receiving cavity extends from one side wall to the opposite side wall.

4. The mounting system as recited in claim 3, wherein the securing opening extend through side walls into the projection receiving opening.

5. The mounting system as recited in claim 4, wherein the latching mechanism is positioned in the latch receiving cavity, the latching mechanism has a first latching arm which extends from a cross member which is retained in the latch receiving cavity.

6. The mounting system as recited in claim 5, wherein the first latching arm has a first engagement portion, a first pivoting portion and a first securing portion, the first pivoting portion has a first opening provided therein.

7. The mounting system as recited in claim 6, wherein the first securing portion has a first securing surface provided at a free end of the first securing portion which is spaced from the first pivoting portion, the first securing portion has a first camming surface which extends between the first securing surface and the first pivoting portion.

8. The mounting system as recited in claim 7, wherein the latching mechanism has a second latching arm which extends from the cross member, which is retained in the latch receiving cavity, the second latching arm has a second engagement portion, a second pivoting portion and a second securing portion, the second pivoting portion has a second opening provided therein.

9. The mounting system as recited in claim 8, wherein the second securing portion has a second securing surface provided at a free end of the second securing portion which is spaced from the second pivoting portion, the second securing portion has a second camming surface which extends between the second securing surface and the second pivoting portion.

10. The mounting system as recited in claim 9, wherein the second latching arm has an overstress protection member which extends from the second engagement portion.

11. The mounting system as recited in claim 1, wherein the clamping portion has a fixed clamping arm and a movable clamping arm which pivots about pivot member between and open position and a closed or clamped position.

12. The mounting system as recited in claim 11, wherein the movable clamping arm has a compressible or resilient member which is provided on an inside portion of the movable clamping arm.

13. The mounting system as recited in claim 1, wherein the latching mechanism has a latching arm with an engagement portion, a pivoting portion and a securing portion, the pivoting portion has an opening provided therein, the securing portion has a securing surface provided at a free end of the securing portion, which is spaced from the pivoting portion, the securing portion is configured to rotate about a post between a first or unlocked position and a second or locked position.

14. A clamp for use with a bracket, the clamp comprising:
a clamping portion;
a mounting portion having a projection receiving opening, the mounting portion having a securing opening which extends through side walls of the mounting portion into the projection receiving opening;
a latching mechanism provided on the clamping portion, the latching mechanism having a securing portion which is rotatable between a locked position, and an unlocked position;
a latch receiving cavity provided in a front wall of the mounting portion, the latch receiving cavity extending from one side wall to an opposite side wall of the mounting portion, the latching mechanism positioned in the latch receiving cavity, the latching mechanism has a first latching arm which extends from a cross member which is retained in the latch receiving cavity.

15. The mounting system as recited in claim 14, wherein securing member receiving cavities extend through side walls into the projection receiving opening.

16. The mounting system as recited in claim 15, wherein the first latching arm has a first engagement portion, a first pivoting portion and a first securing portion, the first pivoting portion has a first opening provided therein, the first securing portion has a first securing surface provided at a free end of the first securing portion which is spaced from the first pivoting portion, the first securing portion has a first camming surface which extends between the first securing surface and the first pivoting portion.

17. The mounting system as recited in claim 16, wherein the latching mechanism has a second latching arm which extends from the cross member which is retained in the latch receiving cavity, the second latching arm has a second engagement portion, a second pivoting portion and a second securing portion, the second pivoting portion has a second opening provided therein, the second securing portion has a second securing surface provided at a free end of the second securing portion which is spaced from the second pivoting portion, the second securing portion has a second camming surface which extends between the second securing surface and the second pivoting portion.

* * * * *